US00RE50783E

(19) United States
(12) Reissued Patent
Ho et al.

(10) Patent Number: US RE50,783 E
(45) Date of Reissued Patent: Feb. 3, 2026

(54) ELECTRICAL TERMINAL AND ELECTRICAL CONNECTOR IN VERTICAL COMPRESSION CONTACT WITH CHIP MODULE

(71) Applicant: LOTES CO., LTD, Keelung (TW)

(72) Inventors: Chien Chih Ho, Keelung (TW); Zuo Feng Jin, Keelung (TW); Yong Jun Dai, Keelung (TW); Chih Kun Chen, Keelung (TW)

(73) Assignee: LOTES CO., LTD, Keelung (TW)

(21) Appl. No.: 18/531,835

(22) Filed: Dec. 7, 2023

Related U.S. Patent Documents

Reissue of:
(64) Patent No.: 11,469,533
Issued: Oct. 11, 2022
Appl. No.: 16/951,363
Filed: Nov. 18, 2020

U.S. Applications:
(63) Continuation-in-part of application No. 16/716,651, filed on Dec. 17, 2019, now abandoned.

(30) Foreign Application Priority Data

Jan. 8, 2019 (CN) ..... 201910014252.2

(51) Int. Cl.
*H01R 13/24* (2006.01)
*H01R 12/71* (2011.01)
(Continued)

(52) U.S. Cl.
CPC ..... *H01R 13/2407* (2013.01); *H01R 12/712* (2013.01); *H01R 13/2435* (2013.01);
(Continued)

(58) Field of Classification Search
CPC ..... H01R 13/2407; H01R 13/2435; H01R 13/2492; H01R 13/40; H01R 12/712; H01R 12/52
See application file for complete search history.

(56) References Cited

U.S. PATENT DOCUMENTS 7,791,443 B1 * 9/2010 Ju ..... H01R 12/52 336/107
2012/0252274 A1 * 10/2012 Ju ..... H01R 12/716 439/626

(Continued)

FOREIGN PATENT DOCUMENTS

| | | | |
|---|---|---|---|
| CN | 201097405 | Y | 8/2008 |
| CN | 201266711 | Y | 7/2009 |
| CN | 207282768 | U | 4/2018 |

*Primary Examiner* — Joshua Kading
(74) *Attorney, Agent, or Firm* — Troutman Pepper Locke LLP; Tim Tingkang Xia, Esq.

(57) ABSTRACT

An electrical terminal includes a base, a first elastic arm and a second elastic arm formed side by side by extending upwardly from an upper end of the base, and a protruding portion. The first elastic arm has a mating portion, and the second elastic arm has a contact portion. The protruding portion protrudes and extends from a first side of the first elastic arm, and the first side of the first elastic arm is adjacent to the second elastic arm. A lower surface of the protruding portion has a contact surface overlapping with the contact portion in a vertical direction, such that the contact portion upwardly abuts the contact surface. When the chip module presses downwardly on the electrical terminal, the contact portion can move on the contact surface, such that the chip module does not need to press downwardly on the contact portion with a relatively large pressure.

15 Claims, 22 Drawing Sheets

(Amended)

(51) Int. Cl.

| | |
|---|---|
| ***H01R 13/40*** | (2006.01) |
| *H01R 4/28* | (2006.01) |
| *H01R 4/48* | (2006.01) |
| *H01R 12/52* | (2011.01) |
| *H01R 12/57* | (2011.01) |
| *H01R 12/72* | (2011.01) |
| *H01R 43/16* | (2006.01) |

(52) U.S. Cl.
CPC ..... *H01R 13/2492* (2013.01); *H01R 13/40* (2013.01); *H01R 4/28* (2013.01); *H01R 4/48* (2013.01); *H01R 12/52* (2013.01); *H01R 12/57* (2013.01); *H01R 12/714* (2013.01); *H01R 12/725* (2013.01); *H01R 13/24* (2013.01); *H01R 13/2428* (2013.01); *H01R 13/2442* (2013.01); *H01R 13/245* (2013.01); *H01R 13/2457* (2013.01); *H01R 43/16* (2013.01)

(56) References Cited

U.S. PATENT DOCUMENTS

| | | | | |
|---|---|---|---|---|
| 2018/0269613 | A1* | 9/2018 | Ju | H01R 12/7076 |
| 2019/0190207 | A1* | 6/2019 | Ju | H01R 12/57 |
| 2019/0334272 | A1* | 10/2019 | Hsu | H01R 12/714 |

* cited by examiner

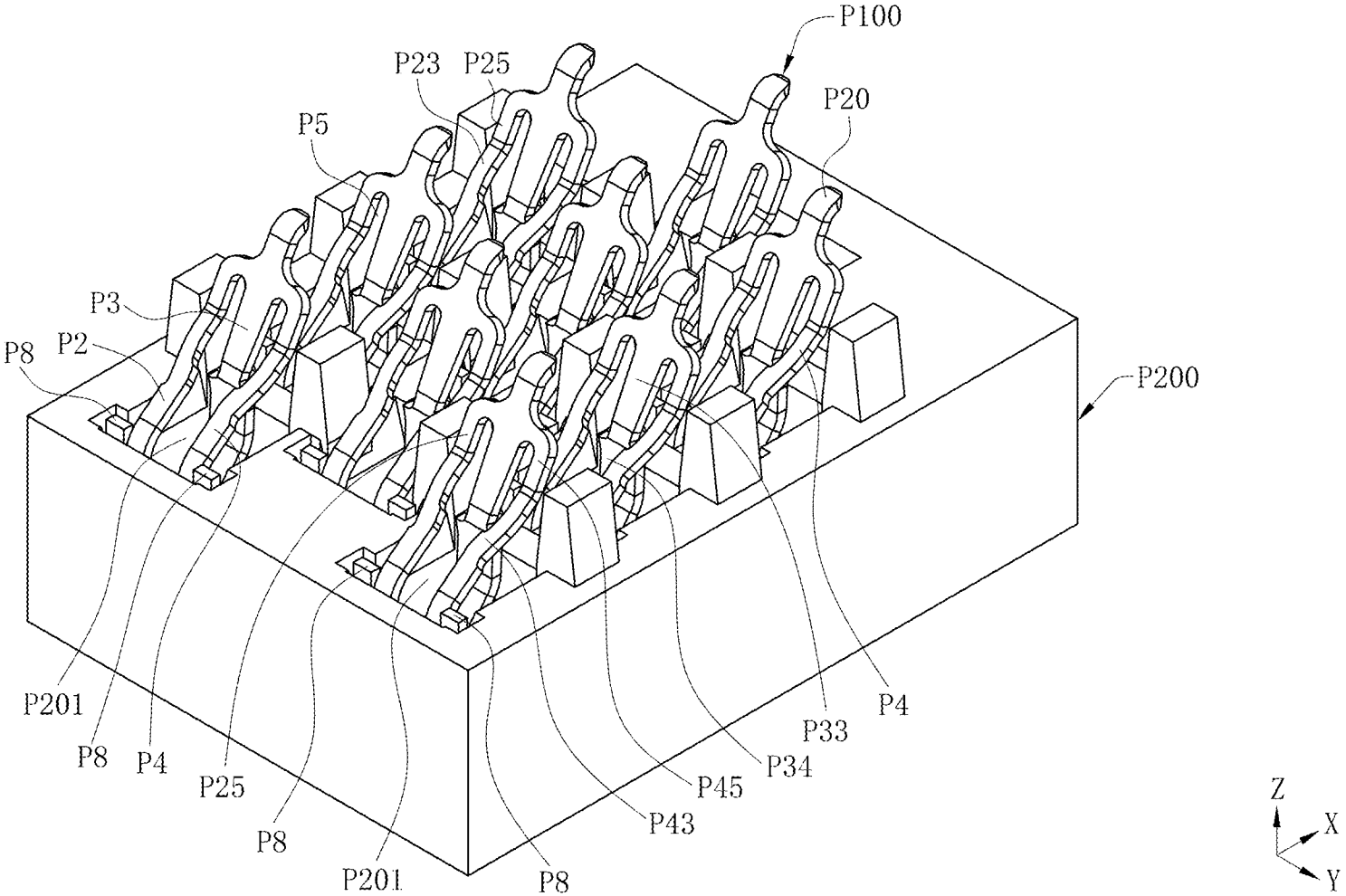
FIG. 11
(Amended)
P

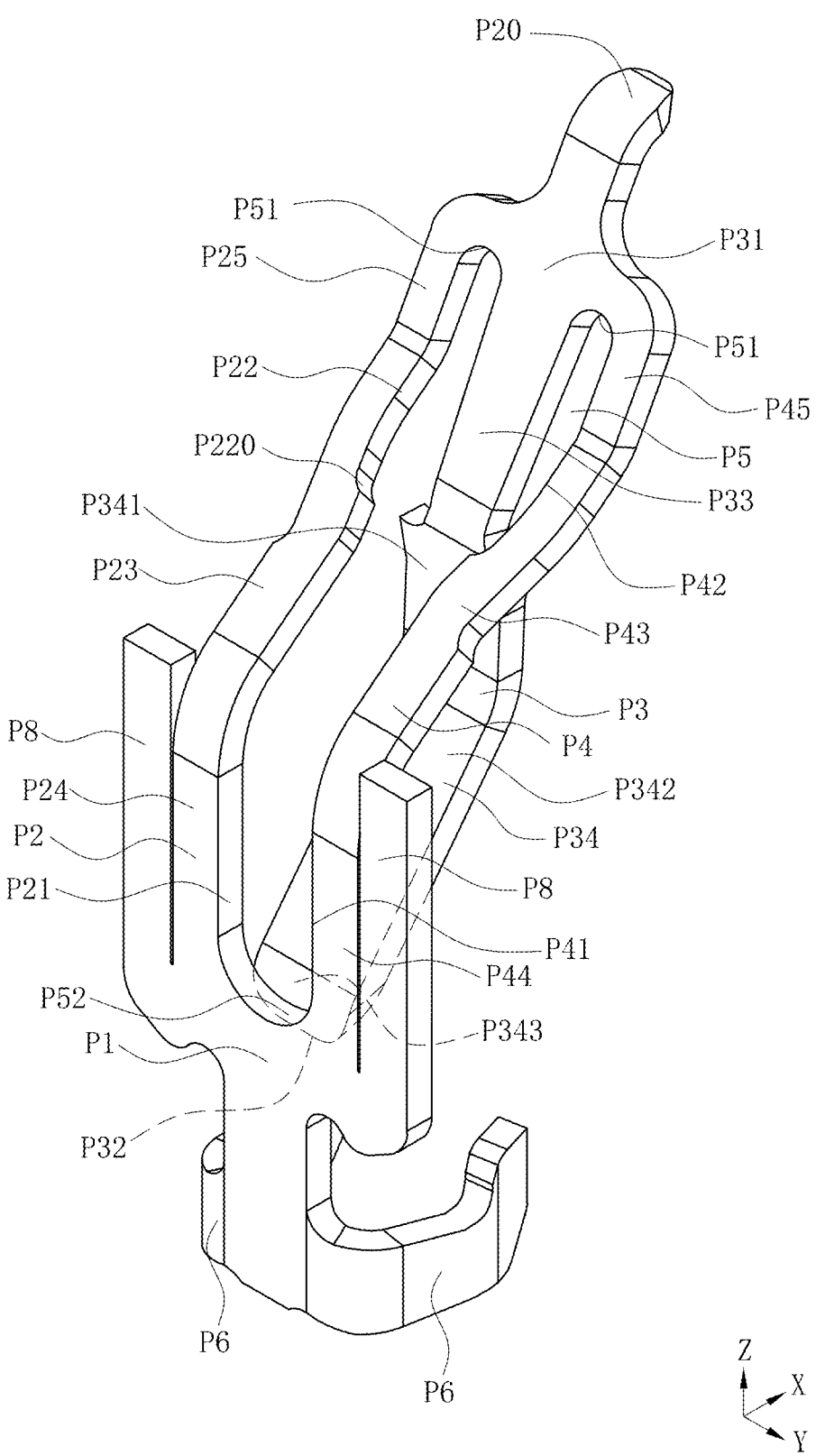
FIG. 13
(Amended)

R

ELECTRICAL TERMINAL AND ELECTRICAL CONNECTOR IN VERTICAL COMPRESSION CONTACT WITH CHIP MODULE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATION

This application is a continuation-in-part of U.S. application Ser. No. 16/716,651, filed Dec. 17, 2019 and currently pending, which itself claims priority to and the benefit of, pursuant to 35 U.S.C. § 119(a), patent application Serial No. CN201910014252.2 filed in China on Jan. 8, 2019. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical terminal and an electrical connector, and in particular to an electrical terminal and an electrical connector in vertical compression contact with a chip module.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Chinese Patent No. CN201721184115.6 discloses an electrical connector, which has a plurality of electrical terminals used to be electrically connected to a chip module. Each electrical terminal includes: a base, an elastic arm formed by bending and extending upward from the base, and a through groove running through the elastic arm along a thickness direction of the elastic arm, such that the elastic arm forms two branches at two sides of the through groove, thereby forming two conductive paths in parallel and respectively passing through the two branches between the chip module and a circuit board to reduce the impedance between the chip module and the circuit board during transmission of electrical signals. However, since the medium surrounding the elastic arm of each electrical terminal is air, and the air has a smaller dielectric coefficient, the impedance of the elastic arm of each electrical terminal is greater, thus affecting the high frequency performance of the electrical terminals.

Therefore, a heretofore unaddressed need to design a new electrical terminal and an electrical connector exists in the art to address the aforementioned deficiencies and inadequacies.

SUMMARY

The present invention is directed to an electrical terminal and an electrical connector, in which the high frequency performance are improved by increasing the capacitance of the elastic arm of each electrical terminal.

To achieve the foregoing objective, the present invention adopts the following technical solutions. An electrical terminal includes: a base; a first elastic arm and a second elastic arm formed side by side by extending upwardly from an upper end of the base, wherein the first elastic arm has a mating portion, and the second elastic arm has a contact portion; and a protruding portion, protruding and extending from a first side of the first elastic arm, wherein the first side of the first elastic arm is adjacent to the second elastic arm, and a lower surface of the protruding portion has a contact surface overlapping with the contact portion in a vertical direction, such that the contact portion upwardly abuts the contact surface.

In certain embodiments, the protruding portion has a cutting surface, a length of the first elastic arm from the cutting surface to the upper end of the base is greater than or equal to a length of the second elastic arm, and the second elastic arm is connected to the cutting surface before being formed and is cut off from the cutting surface after being formed.

In certain embodiments, a first torn surface is provided on the first side of the first elastic arm adjacent to the second elastic arm, and one of two opposite sides of the second elastic arm is formed by tearing from the first torn surface.

In certain embodiments, a third elastic arm extends upwardly from the base to the protruding portion, the second elastic arm is located between the first elastic arm and the third elastic arm, a second torn surface is provided on one side of the third elastic arm adjacent to the second elastic arm, the other of the two opposite sides of the second elastic arm is formed by tearing from the second torn surface, and the first elastic arm and the third elastic arm are provided in parallel.

In certain embodiments, a strip connecting portion is formed by extending from the base and is configured to be connected to a strip, the strip connecting portion is located at a second side of the first elastic arm, and the second side of the first elastic arm is located away from the second elastic arm.

In certain embodiments, the first elastic arm has a connecting portion connected to the upper end of the base, the connecting portion and the protruding portion are located at two opposite sides of the base, the second elastic arm has an extending portion connected to the upper end of the base, the extending portion and the contact portion are located at the two opposite sides of the base, and the connecting portion and the extending portion are located at a same side of the base.

In certain embodiments, the contact portion is flat plate shaped, and the contact surface is arc shaped.

The present invention further provides an electrical connector, configured to be electrically connected to a chip module. The electrical connector includes: a body, having a plurality of accommodating holes running vertically; and a plurality of electrical terminals, respectively accommodated in the accommodating holes correspondingly, wherein each of the electrical terminals has: a base, being flat plate shaped; a strip connecting portion, formed by extending upwardly from an upper end of the base, and configured to be connected to a strip; a first elastic arm formed by extending upwardly from the upper end of the base, wherein a top portion of the first elastic arm has a mating portion configured to upwardly abut the chip module, a through groove runs through the first elastic arm along a thickness direction of the first elastic arm, one of an upper end and a lower end of the through groove is defined as a first end, and the other of the upper end and the lower end of the through groove is defined as a second end; and a second elastic arm, wherein one of an upper end and a lower end of the second elastic arm is defined as a third end, the other of the upper end and the lower end of the second elastic arm is defined as a fourth end, the third end is integrally connected to the first end, the fourth end is integrally connected to the second end prior to being formed and is broken from the second end after being formed, the second elastic arm has a contact portion, and when the chip module is pressed downwardly on the mating portion to a final position, the contact portion is in contact with the base or the first elastic arm.

In certain embodiments, the electrical terminal further has a third elastic arm, a lower end of the third elastic arm is integrally connected to the base and an upper end is integrally connected to the first elastic arm, the first elastic arm and the third elastic arm are located at a left side and a right side of the second elastic arm, a first torn surface is provided on one side of the first elastic arm adjacent to the second elastic arm, a second torn surface is provided on one side of the third elastic arm adjacent to the second elastic arm, and two opposite sides of the second elastic arm are formed correspondingly by tearing from the first torn surface and the second torn surface.

In certain embodiments, a torn surface is provided on one side of the first elastic arm adjacent to the second elastic arm, the second elastic arm is formed by tearing from the torn surface; the first elastic arm further has a blanking surface, the blanking surface is formed by blanking the second elastic arm, and the blanking surface has an arc surface connected to the torn surface.

In certain embodiments, the first end is the lower end of the through groove, the second end is the upper end of the through groove, the third end is the lower end of the second elastic arm, the fourth end is the upper end of the second elastic arm, and the first elastic arm has a contact surface overlapping with the contact portion in a vertical direction, such that the contact portion upwardly abuts the contact surface.

In certain embodiments, the first end is the upper end of the through groove, the second end is the lower end of the through groove, the third end is the upper end of the second elastic arm, the fourth end is the lower end of the second elastic arm, and the contact portion abuts a front surface of the base.

In certain embodiments, when the chip module does not downwardly abut the mating portion, the contact portion does not abut the base.

In certain embodiments, the first elastic arm has a vertical portion, and the vertical portion and the strip connecting portion are provided side by side in a left-right direction.

In certain embodiments, the first elastic arm has a main body portion and an upper portion formed by extending upwardly from the main body portion, the second elastic arm has a first portion and a second portion formed by extending downwardly from the first portion, the second portion is located in front of the main body portion, and the mating portion, the upper portion of the first elastic arm and the first portion of the second elastic arm are located on a same plane.

In certain embodiments, the second portion has a first section formed by bending forwardly from the first portion and extending downwardly, a second section formed by bending backwardly from the first section and extending downwardly, and the contact portion formed by bending forwardly from the second section and extending downwardly.

In certain embodiments, two adjacent electrical terminals of the electrical terminals in a front-rear direction are provided to be staggered in the front-rear direction, and viewing from a lateral direction, the second elastic arm of a rear electrical terminal of the two adjacent electrical terminals in the front-rear direction and the first elastic arm of a front electrical terminal of the two adjacent electrical terminals in the front-rear direction at least partially overlap with each other.

The present invention further provides an electrical connector, which includes: a body; and a plurality of electrical terminals, accommodated in the body, wherein each of the electrical terminals comprises: a base; an elastic arm formed by extending upwardly from the base, wherein a through groove runs through the elastic arm along a thickness direction of the elastic arm, such that the elastic arm forms two branches at a left side and a right side of the through groove; and a soft portion integrally connecting an upper end and a lower end of the through groove, wherein the two branches are located at a left side and a right side of the soft portion, an average width of the soft portion is less than 1.5 times a thickness of the soft portion, a softness of the soft portion is greater than a softness of the two branches, and the soft portion protrudes forwardly relative to the two branches; wherein the elastic arm has a mating portion in front of the through groove and configured to upwardly abut a chip module.

In certain embodiments, two adjacent electrical terminals of the electrical terminals in a front-rear direction are provided to be staggered in the front-rear direction, and viewing from a lateral direction, the soft portion of a rear electrical terminal of the two adjacent electrical terminals in the front-rear direction and the branches of a front electrical terminal of the two adjacent electrical terminals in the front-rear direction at least partially overlap with each other.

In certain embodiments, each of the electrical terminals further has two strip connecting portions configured to be connected to a same strip, the two strip connecting portions extend upwardly from an upper end of the base and are located at a left side and a right side of the elastic arm, and a maximum distance between two side edges of the two branches away from the soft portion is greater than a distance between two side edges of the two strip connecting portions adjacent to the soft portion and is less than a distance between two side edges of the two strip connecting portions away from the soft portion.

Compared with the related art, the electrical terminal and the electrical connector according to certain embodiments of the present invention have the following beneficial effects.

The second portion of the second elastic arm or the second branch is located in front of the main body portion of the first elastic arm or the first branch, which is equivalent to increasing a thickness of the elastic arm in the front-rear direction, thus increasing the capacitance of the electrical terminal, thereby reducing the impedance of the electrical terminal, and further improving the high frequency performance of the electrical terminal.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 11 is a schematic perspective view of an electrical connector according to a third embodiment of the present invention.

FIG. 13 is a schematic perspective view of the electrical terminal in FIG. 12 after being formed.

DETAILED DESCRIPTION

Figure 1:
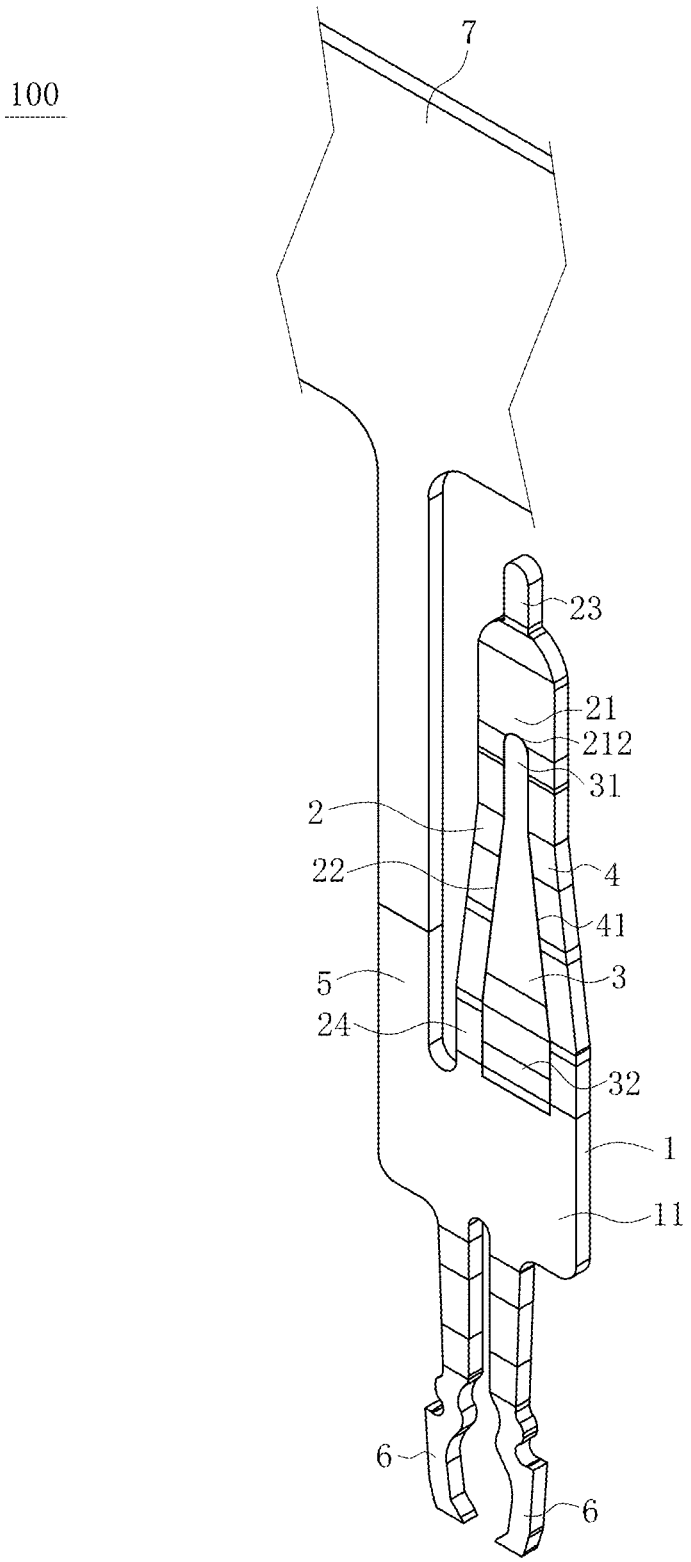
FIG. 1 is a schematic perspective view of an electrical terminal before being formed according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-22. In accordance with the purposes of this invention, as embodied and broadly described herein, this invention, in one aspect, relates to an electrical terminal and an electrical connector.

As shown in the drawings, an extending direction of the X-axis is defined as a front-rear direction (where the positive direction of the X-axis is a forward direction), an extending direction of the Y-axis is defined as a left-right direction (where the positive direction of the Y-axis is a rightward direction), and an extending direction of the Z-axis is defined as a vertical direction (where the positive direction of the Z-axis is an upward direction).

FIG. 1 to FIG. 5 show an electrical terminal 100 according to a first embodiment of the present invention, which is used to electrically connect a chip module (not shown) and a circuit board (not shown). The electrical terminal 100 is formed by stamping a metal plate. Each electrical terminal 100 includes a base 1 that is vertical flat plate shaped, and the base 1 has a vertical plain surface 11. A first elastic arm 2, a second elastic arm 3, and a third elastic arm 4 are formed side by side by bending and extending upwardly from an upper end of the base 1, and the second elastic arm 3 is located between the first elastic arm 2 and the third elastic arm 4. The first elastic arm 2 has a first side and a second side, where the first side of the first elastic arm 2 is adjacent to the second elastic arm 3, and the second side of the first elastic arm 2 is located away from the second elastic arm 3. A strip connecting portion 5 is formed by vertically extending upwardly from the base 1 to be connected to a strip 7, and the strip connecting portion 5 is located at the second side of the first elastic arm 2. A pair of clamping portions 6 are formed by bending and extending downwardly from a lower end of the base 1 to jointly clamp a solder ball (not shown), which is used to be soldered to the circuit board.

Figure 2:
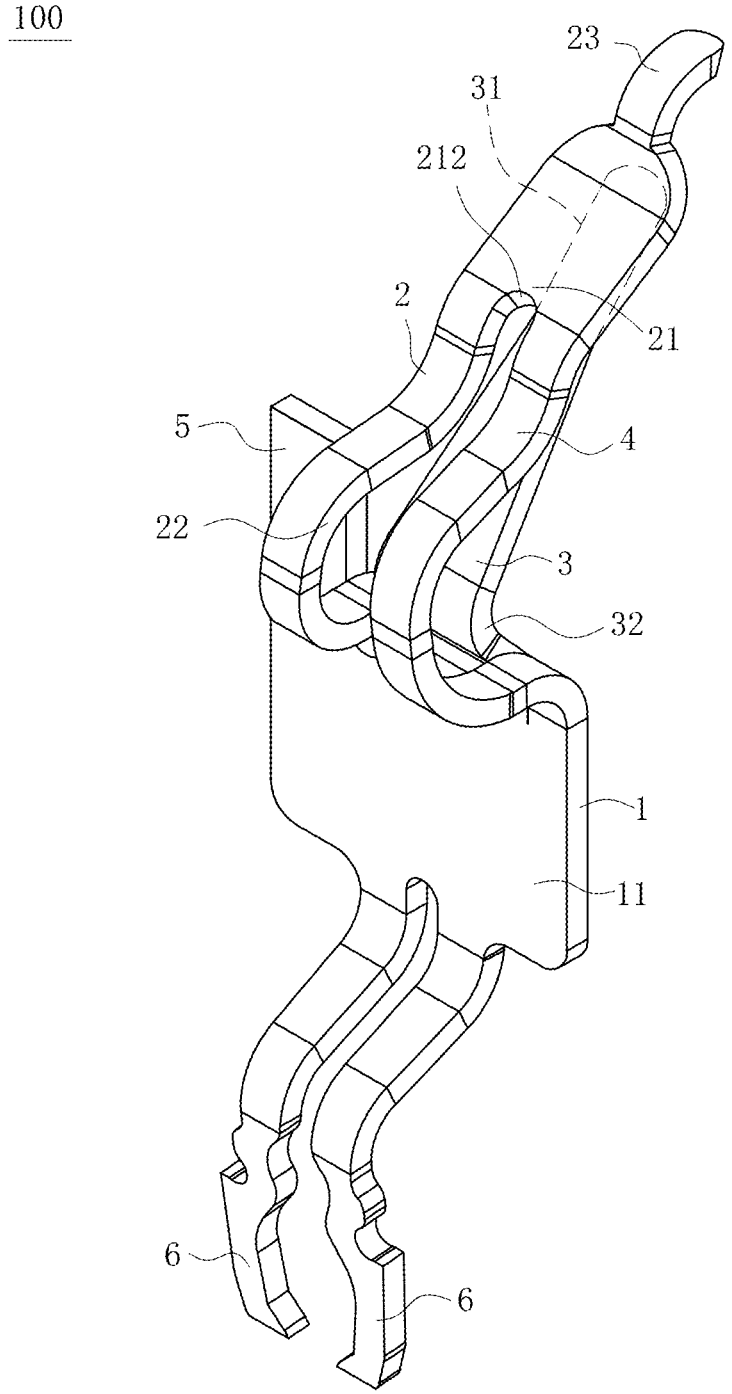
FIG. 2 is a schematic perspective view of the electrical terminal in FIG. 1 after being formed.
Figure 4:
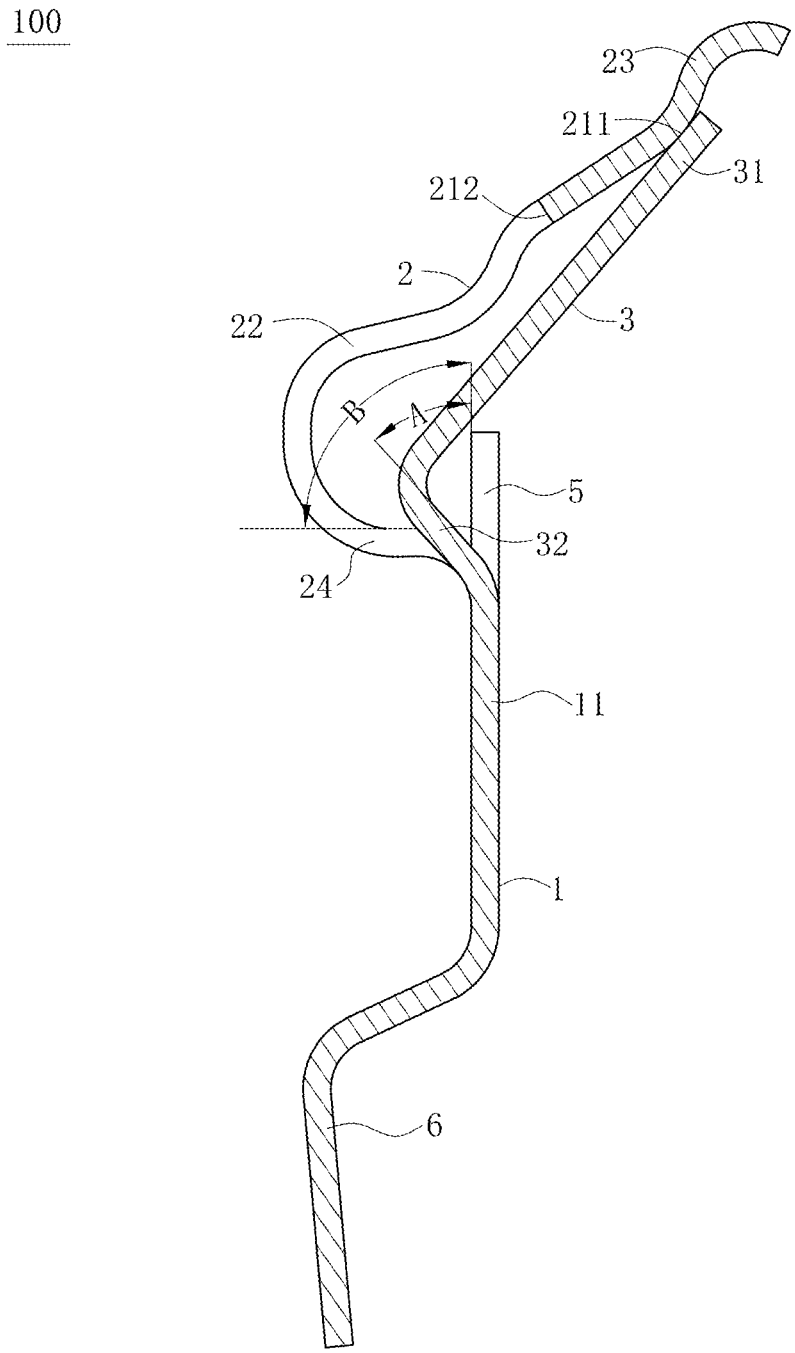
FIG. 4 is a sectional view of FIG. 3 along the A-A direction.
Figure 5:
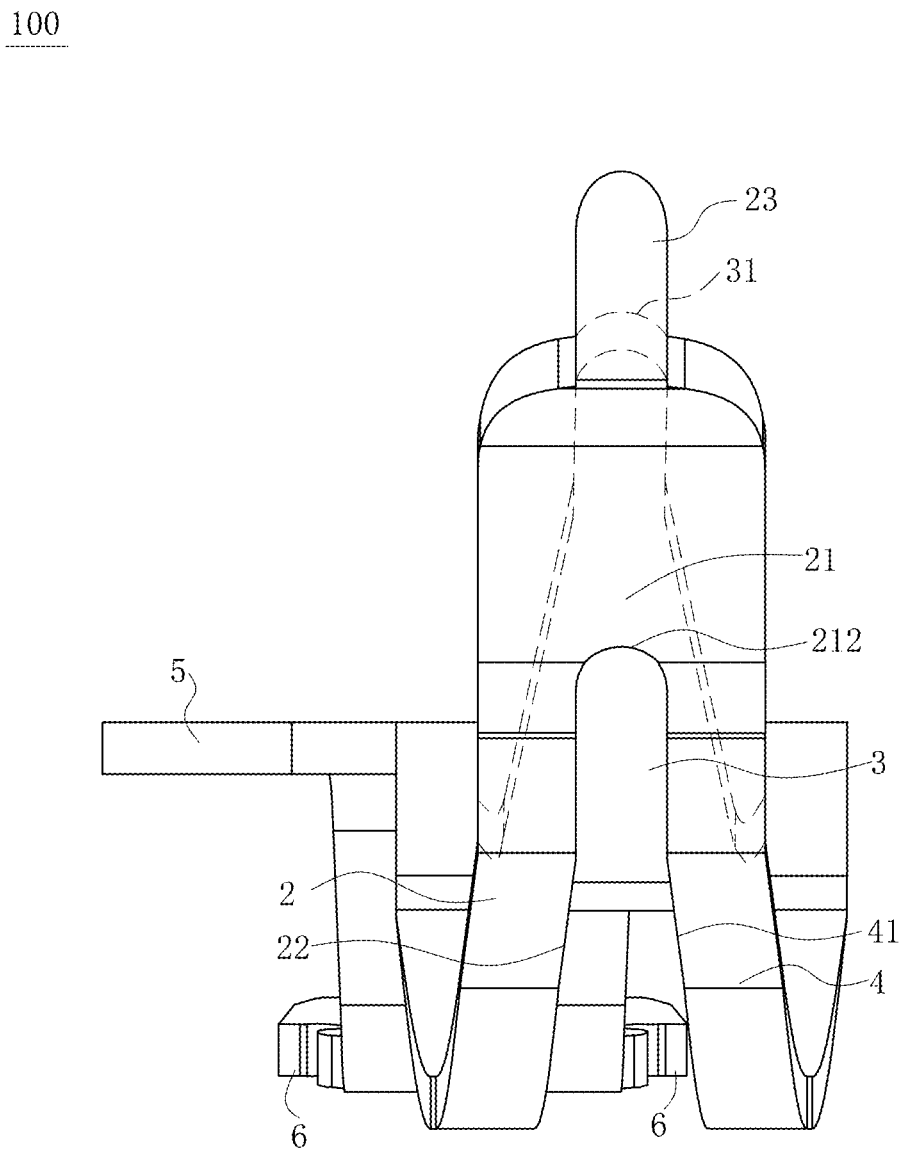
FIG. 5 is a top view of FIG. 2.

As shown in FIG. 2 and FIG. 4, the first elastic arm 2 extends upwardly from the upper end of the base 1 toward a direction away from the vertical plain surface 11, and bends and extends reversely to cross the vertical plain surface 11. A first torn surface 22 is provided on the first side of the first elastic arm 2. A protruding portion 21 laterally protrudes and extends from the first torn surface 22, and the protruding portion 21 has a cutting surface 212 connected to the first torn surface 22. A lower surface of the protruding portion 21 has a contact surface 211, and the contact surface 211 is arc shaped. A top portion of the first elastic arm 2 is provided with a mating portion 23 to upwardly abut the chip module, and the mating portion 23 is connected to the contact surface 211. The first elastic arm 2 has a connecting portion 24 connected to the upper end of the base 1, and the connecting portion 24 and the protruding portion 21 are located at two opposite sides of the base 1.

Figure 3:
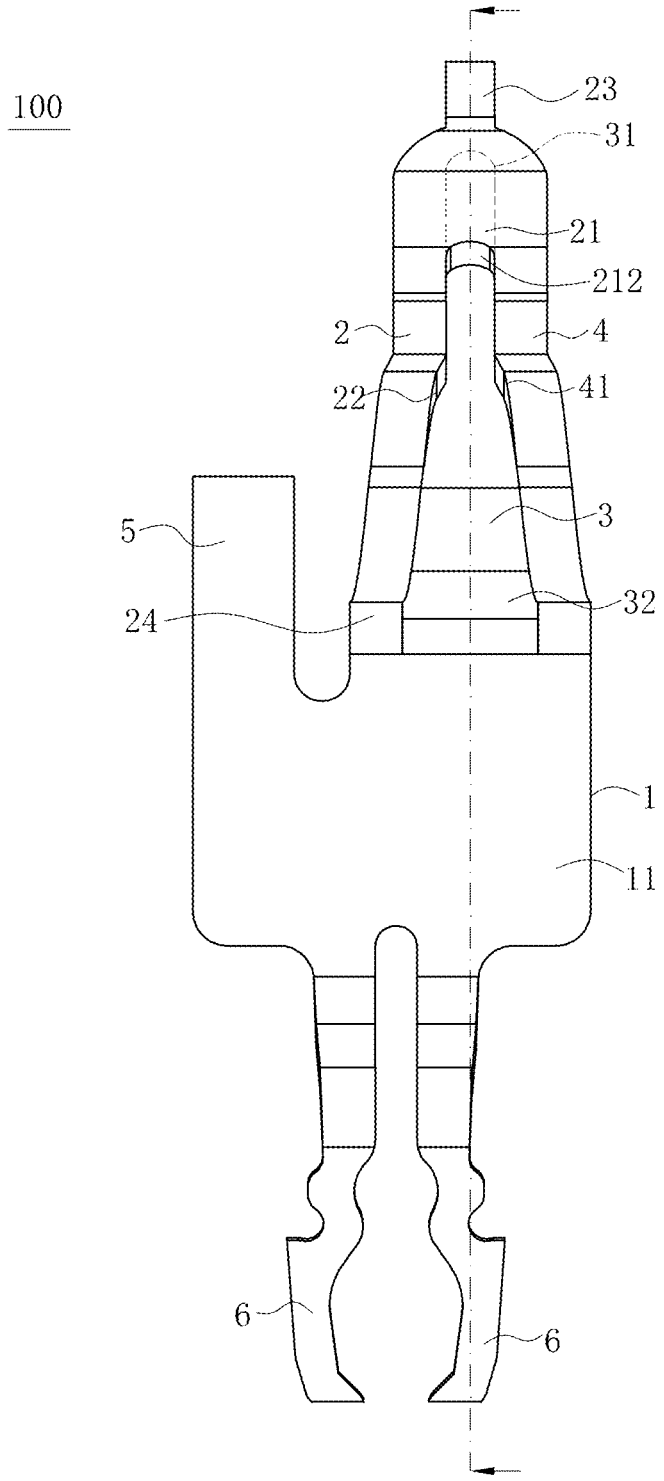
FIG. 3 is a back view of FIG. 2.

As shown in FIG. 2 to FIG. 4, the third elastic arm 4 bends and extends from the upper end of the base 1 to the protruding portion 21. A second torn surface 41 is provided on one side of the third elastic arm 4 adjacent to the second elastic arm 3. The third elastic arm 4 and the first elastic arm 2 are provided in parallel, and the structure of the first elastic arm 2 from the protruding portion 21 to the upper end of the base 1 is the identical to that of the third elastic arm 4.

As shown in FIG. 2 to FIG. 4, a junction between the second elastic arm 3 and the base 1 and a junction between the first elastic arm 2 and the base 1 are provided side by side. The second elastic arm 3 extends upwardly from the upper end of the base 1 toward a direction away from the vertical plain surface 11, and bends and extends reversely direction to cross the vertical plain surface 11. A width of the second elastic arm 3 gradually decreases along an upward-from-bottom direction. The second elastic arm 3 has a contact portion 31, and the contact portion 31 is flat plate shaped. The contact portion 31 and the contact surface 211 overlap with each other vertically, and the contact portion 31 upwardly abuts the contact surface 211. When the chip module presses downwardly on the mating portion 23, the contact portion 31 can move on the contact surface 211. Therefore, the chip module does not need to press downwardly on the mating portion 23 with a relatively large pressure. The second elastic arm 3 is connected to the cutting surface 212 before being formed (as shown in FIG. 1). During forming, a tail end of the second elastic arm 3 is cut off from the cutting surface 212, and two opposite sides of the second elastic arm 3 are formed by tearing from the first torn surface 22 and the second torn surface 41, such that the width of the second elastic arm 3 is equal to a gap width between the first elastic arm 2 and the third elastic arm 4, and a length of the second elastic arm 3 is equal to a length of the first elastic arm 2 from the cutting surface 212 to the upper end of the base 1. In another embodiment, the tail end of the second elastic arm 3 can be cut off from the protruding portion 21 through blanking, and therefore, the length of the first elastic arm 2 from the cutting surface 212 to the upper end of the base 1 is greater than the length of the second elastic arm 3. The second elastic arm 3 has an extending portion 32 connected to the upper end of the base 1. The extending portion 32 and the contact portion 31 are located at two opposite sides of the base 1, and the connecting portion 24 and the extending portion 32 are located at a same side of the base 1. A bending angle A of the extending portion 32 relative to the base 1 is smaller than a bending angle B of the connecting portion 24 relative to the base 1.

FIG. 6 to FIG. 10 show an electrical terminal 100' according to a second embodiment of the present invention. The electrical terminal 100' is used to electrically connect a chip module (not shown) and a circuit board (not shown). The electrical terminal 100' is formed by stamping a metal plate. Each electrical terminal 100' includes a base 1' that is vertically flat plate shaped, and the base 1' has a vertical plain surface 11'. A first elastic arm 2' and a second elastic arm 3' are formed by bending and extending upwardly from an upper end of the base 1'. The first elastic arm 2' has a first side and a second side, where the first side of the first elastic arm 2' is adjacent to the second elastic arm 3', and the second side of the first elastic arm 2' is located away from the second elastic arm 3'. A strip connecting portion 5' is formed by bending from one side of the base 1' to be connected to a strip 7', and the strip connecting portion 5' is located at the second side of the first elastic arm 2'. A first clamping arm 61 is formed by tearing, bending, and extending from a center of a lower end of the base 1' to one side, such that a second clamping arm 62 is formed at each of two opposite sides of the first clamping arm 61. The first clamping arm 61 and the two second clamping arms 62 jointly clamp a solder ball (not shown) to be soldered to the circuit board.

Figure 7:
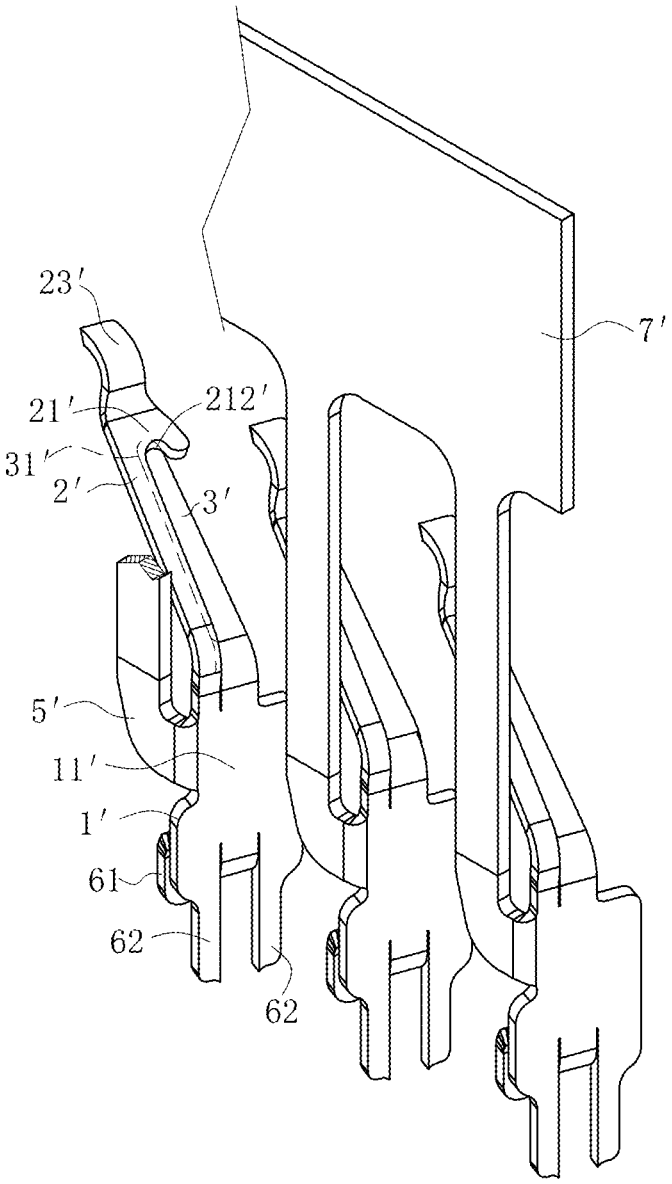
FIG. 7 is a schematic perspective view of the electrical terminal in FIG. 6 being connected to a strip after being formed.
Figure 8:
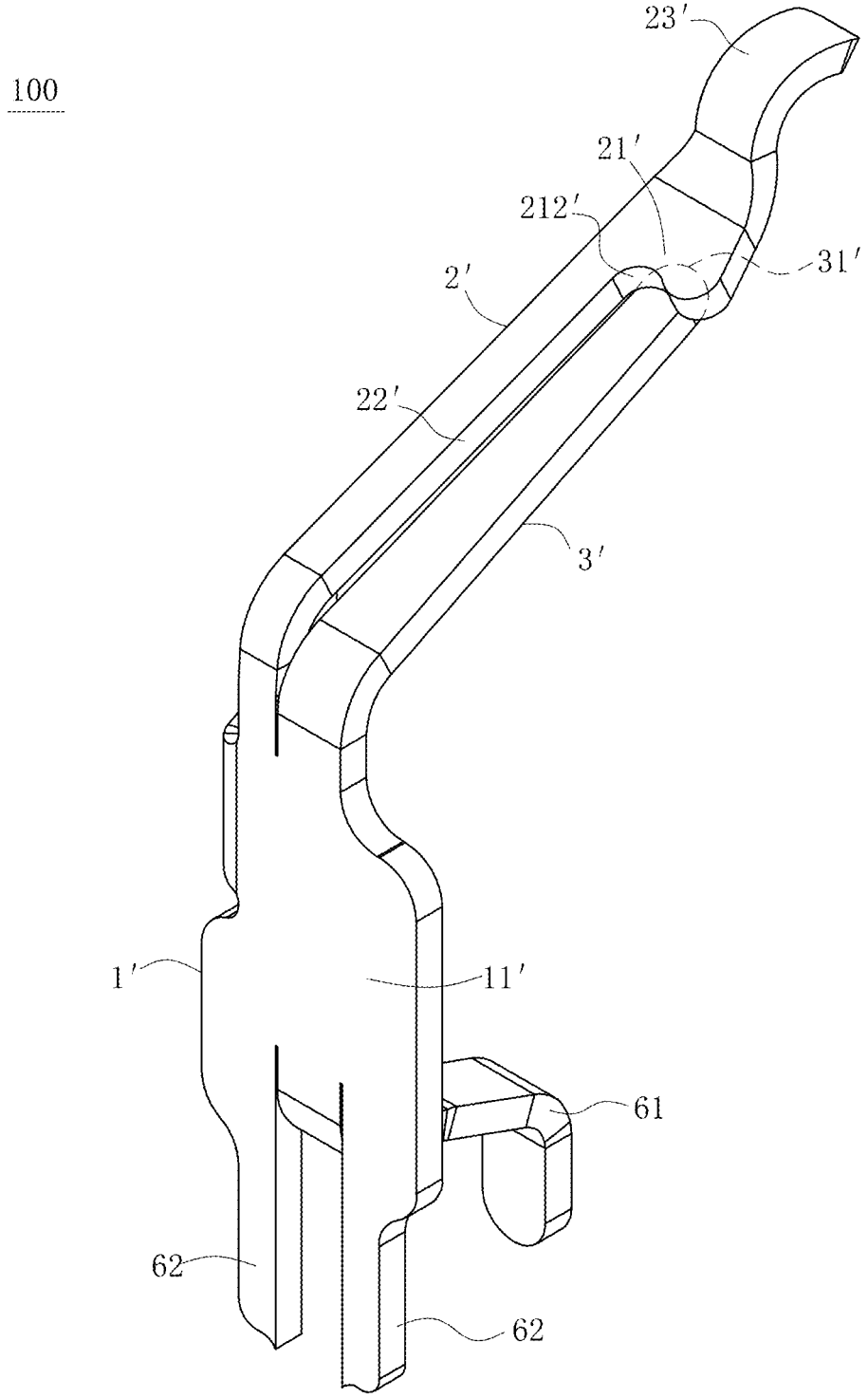
FIG. 8 is a schematic perspective view of the electrical terminal according to the second embodiment of the present invention.
Figure 9:
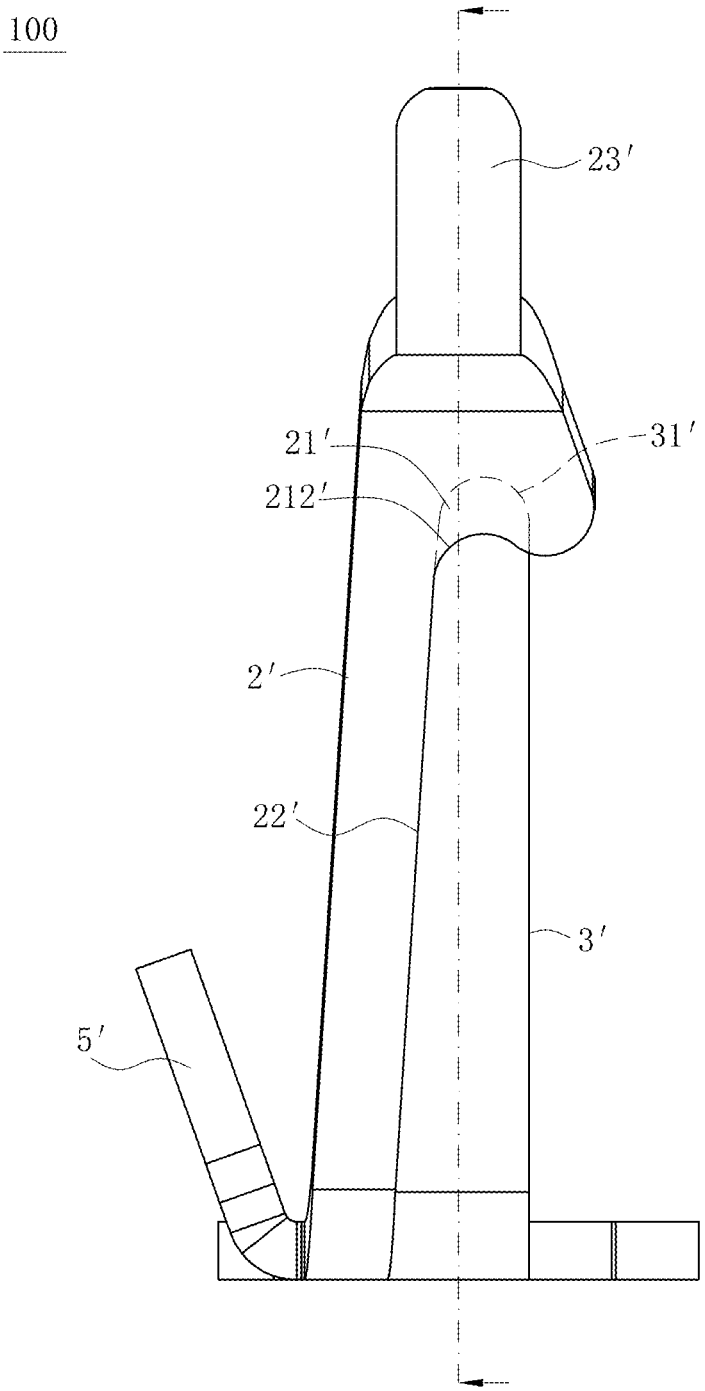
FIG. 9 is a top view of FIG. 8.
Figure 10:
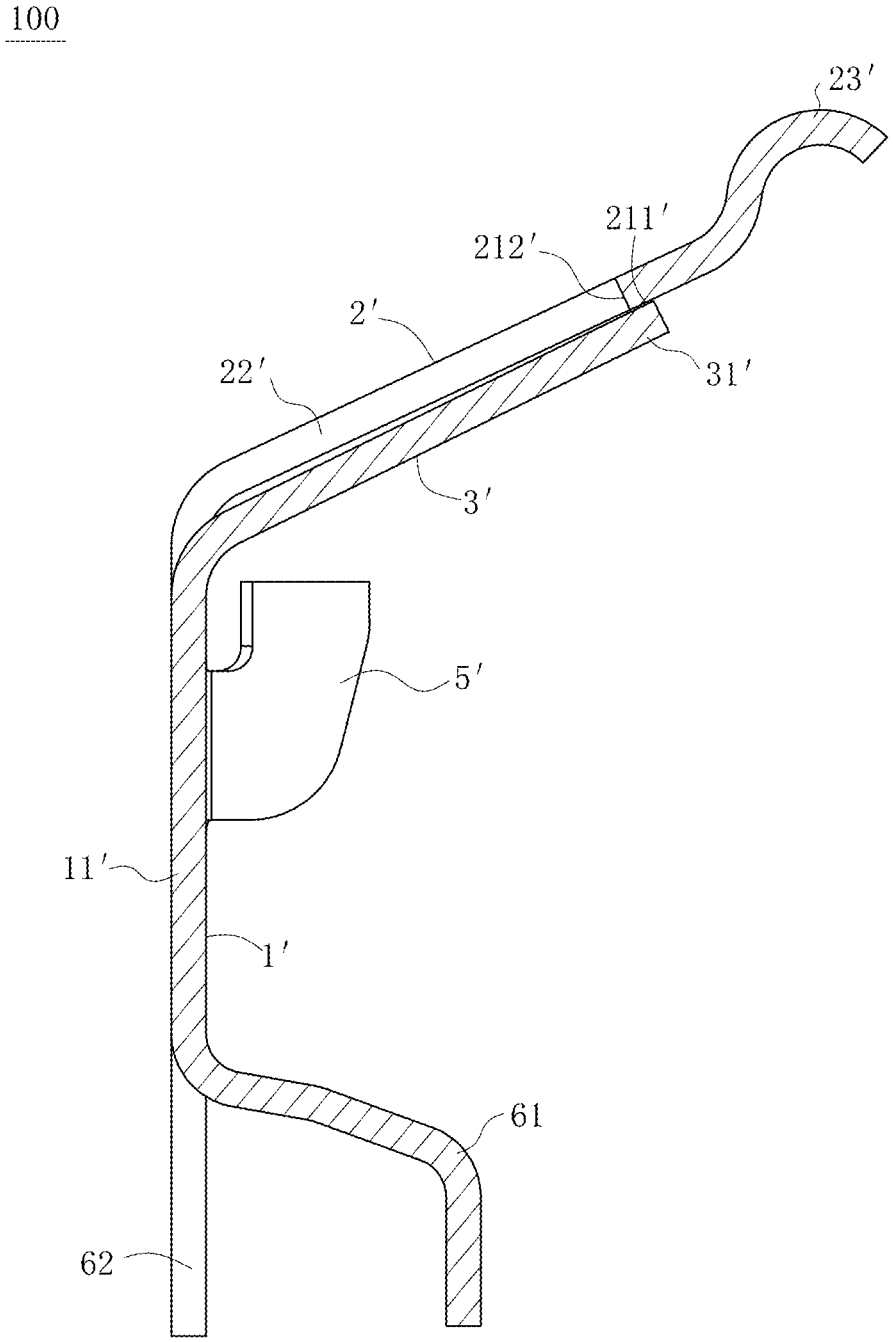
FIG. 10 is a sectional view of FIG. 9 along the B-B direction.

As shown in FIG. 7 to FIG. 9, the first elastic arm 2' bends and extends from the upper end of the base 1' to one side of the vertical plain surface 11'. A torn surface 22' is provided on the first side of the first elastic arm 2'. A protruding portion 21' laterally protrudes and extends from the torn surface 22', and the protruding portion 21' has a cutting surface 212' connected to the torn surface 22'. A length of the first elastic arm 2' from the cutting surface 212' to the upper end of the base 1' is greater than or equal to a length of the second elastic arm 3'. A lower surface of the protruding portion 21' has a contact surface 211' (as shown in FIG. 10). A top portion of the first elastic arm 2' is provided with a mating portion 23' to upwardly abut the chip module.

Figure 6:
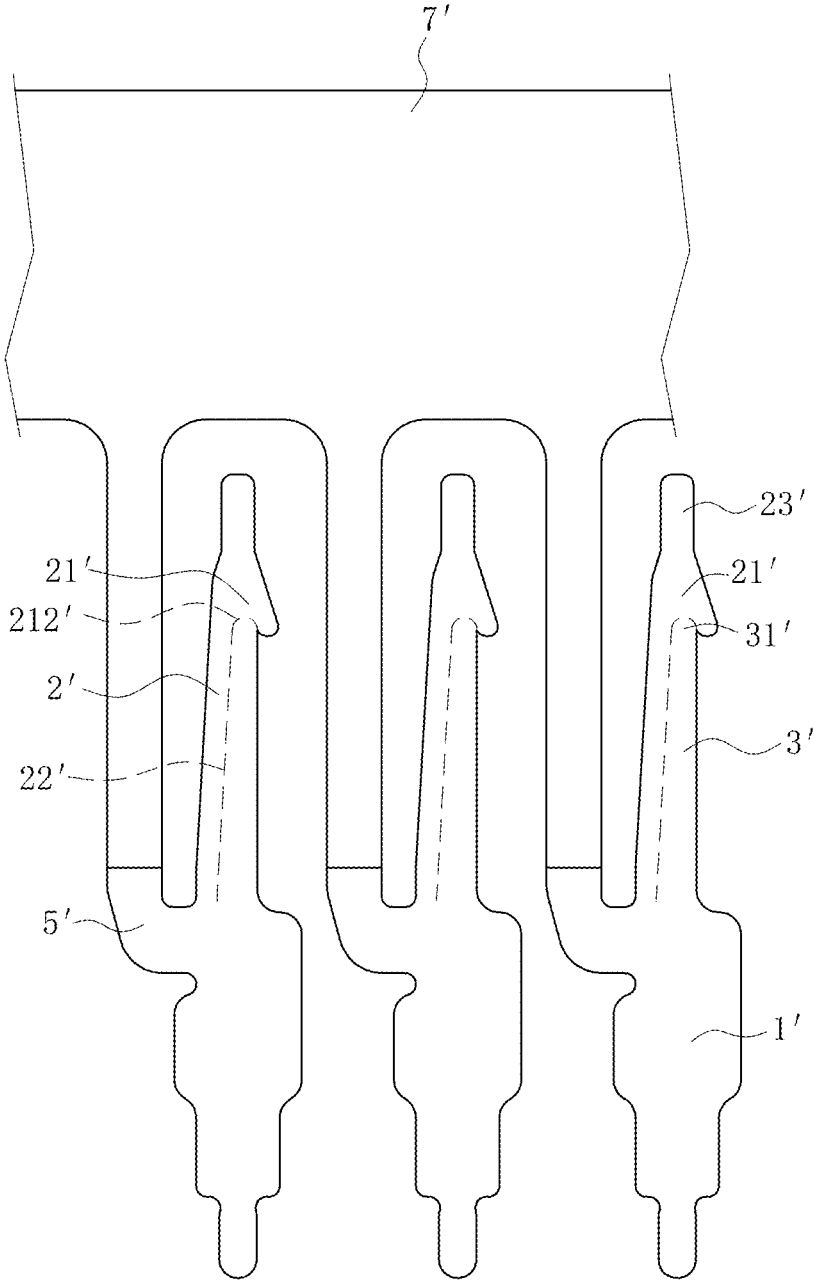
FIG. 6 is a schematic perspective view of an electrical terminal before being formed according to a second embodiment of the present invention.

As shown in FIG. 8 and FIG. 9, a junction between the second elastic arm 3' and the base 1' and a junction between the first elastic arm 2' and the base 1' are provided side by side. The second elastic arm 3' bends and extends from the upper end of the base 1' to one side of the vertical plain surface 11'. A bending angle of the second elastic arm 3' relative to the base 1' is smaller than a bending angle of the first elastic arm 2' relative to the base 1'. The second elastic arm 3' has a contact portion 31', and the contact portion 31' is flat plate shaped. The contact portion 31' and the contact surface 211' overlap in a vertical direction, and the contact portion 31' upwardly abuts the contact surface 211'. When the chip module presses downwardly on the mating portion 23', the contact portion 31' can move on the contact surface 211'. Therefore, the chip module does not need to press downwardly on the mating portion 23' with a relatively large pressure. The second elastic arm 3' is connected to the cutting surface 212' before being formed (as shown in FIG. 6). During forming, a tail end of the second elastic arm 3' is cut off from the cutting surface 212', and the second elastic arm 3' is formed at one side adjacent to the first elastic arm 2' by slitting from the torn surface 22'.

FIG. 11 to FIG. 14 show an electrical connector P according to a third embodiment of the present invention. The electrical connector P includes a body P200 and a plurality of electrical terminals P100 accommodated in the body P200. The electrical terminals P100 are used to electrically connect a chip module Q to a circuit board O. The body P200 has a plurality of accommodating holes P201 running vertically therethrough, and the electrical terminals P100 are correspondingly accommodated in the accommodating holes P201.

Figure 12:
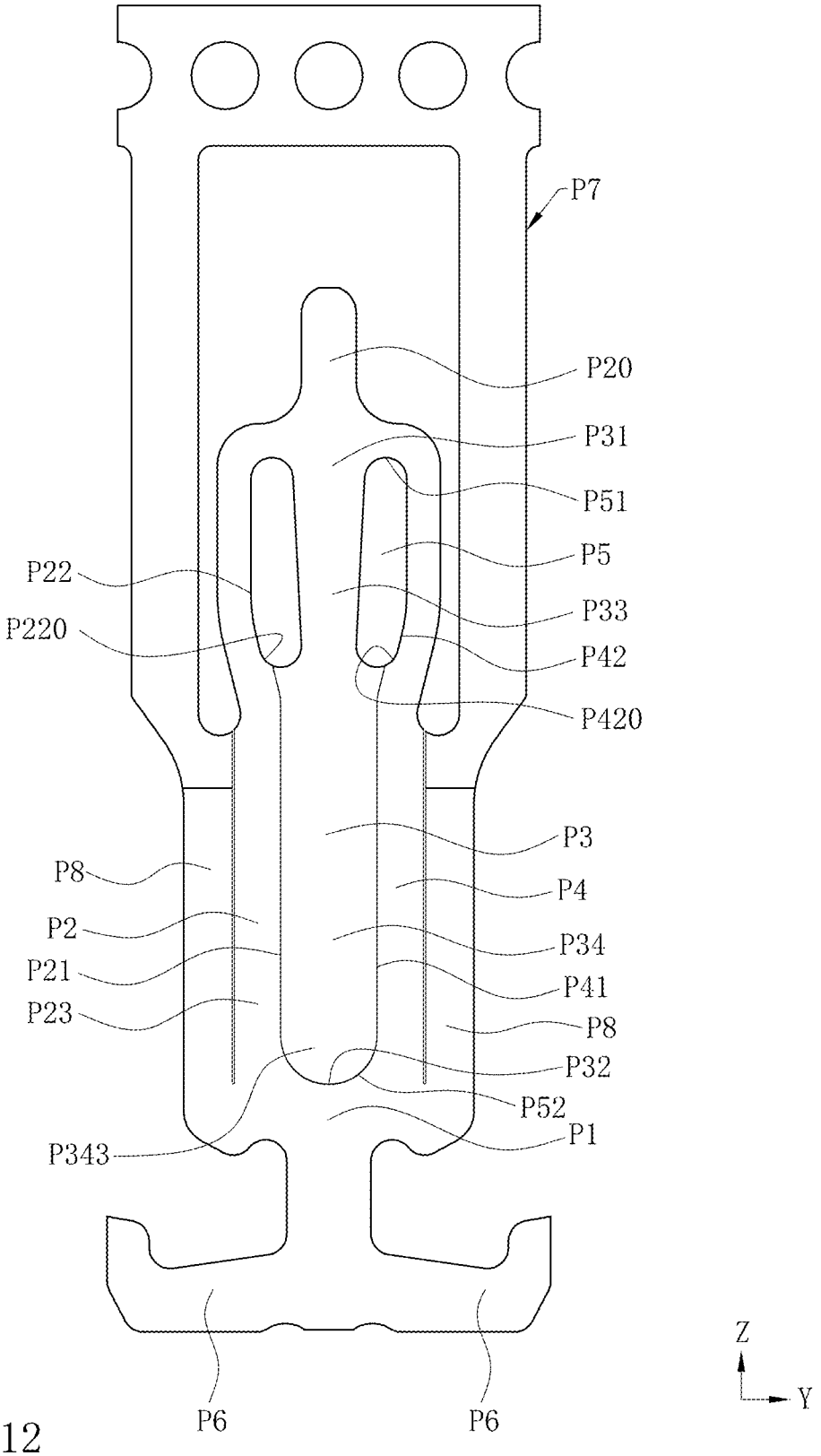
FIG. 12 is a plain view of an electrical terminal before being formed according to the third embodiment of the present invention.
Figure 15:
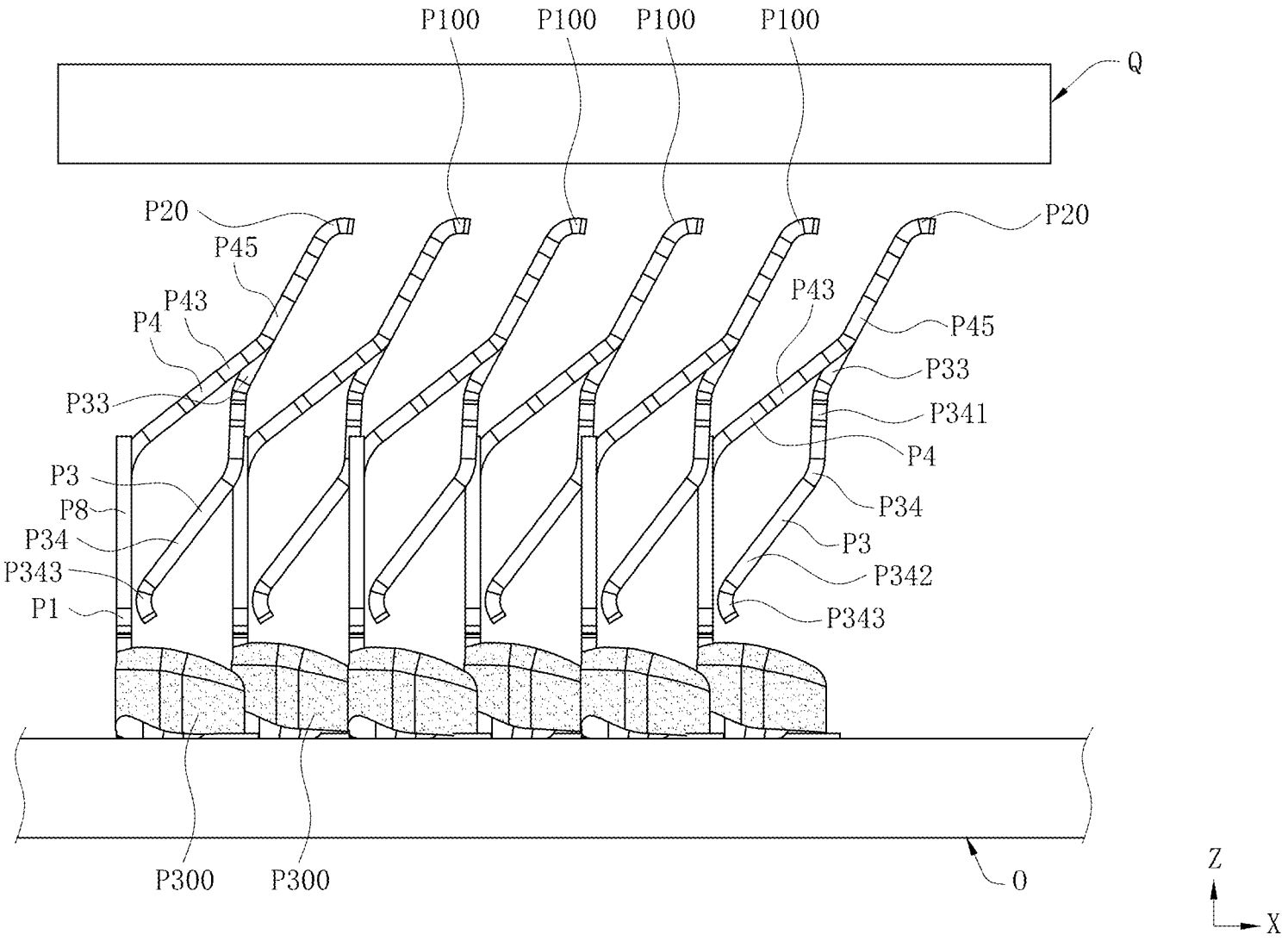
FIG. 15 is a side view of the electrical connector (with the body being removed) according to the third embodiment of the present invention.

As shown in FIG. 12, FIG. 13 and FIG. 15, the electrical terminals P100 are formed by punching a metal plate. Each electrical terminal P100 includes a base P1 being vertical flat plate shaped. A first elastic arm P2 is formed by bending and extending upwardly from an upper end of the base P1. A top portion of the first elastic arm P2 has a mating portion P20 configured to upwardly abut the chip module Q. A through groove P5 runs through the first elastic arm P2 along a thickness direction of the first elastic arm P2. An upper end of the through groove P5 is defined as a first end P51, and a lower end of the through groove P5 is defined as a second end P52. A second elastic arm P3 is located at a right side of the first elastic arm P2. An upper end of the second elastic arm P3 is defined as a third end P31, and a lower end of the second elastic arm P3 is defined as a fourth end P32. The third end P31 is integrally connected to the first end P51. The fourth end P32 is integrally connected to the second end P52 prior to being formed, and the fourth end P32 is broken from the second end P52 after being formed. A third elastic arm P4 is provided. An upper end of the third elastic arm P4 is integrally connected to the first elastic arm P2, and a lower end of the third elastic arm P4 is integrally connected to the base P1. The first elastic arm P2 and the third elastic arm P4 are located at a left side and a right side of the second elastic arm P3. A first torn surface P21 is provided on a right side of the first elastic arm P2, and a second torn surface P41 is provided on a left side of the third elastic arm P4. Two opposite sides of the second elastic arm P3 are formed correspondingly by tearing from the first torn surface P21 and the second torn surface P41.

Figure 14:
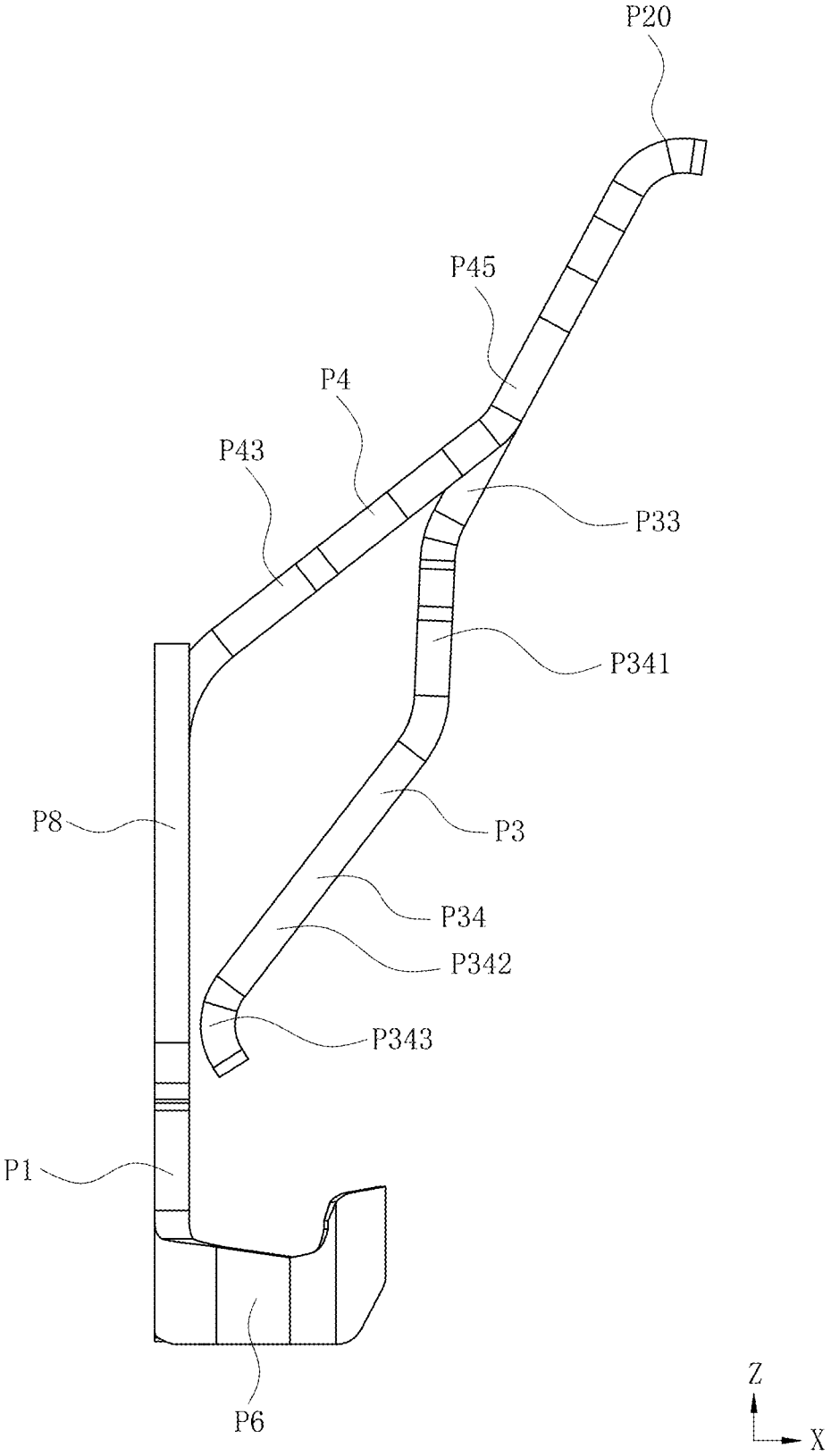
FIG. 14 is a side view of FIG. 13.
Figure 16:
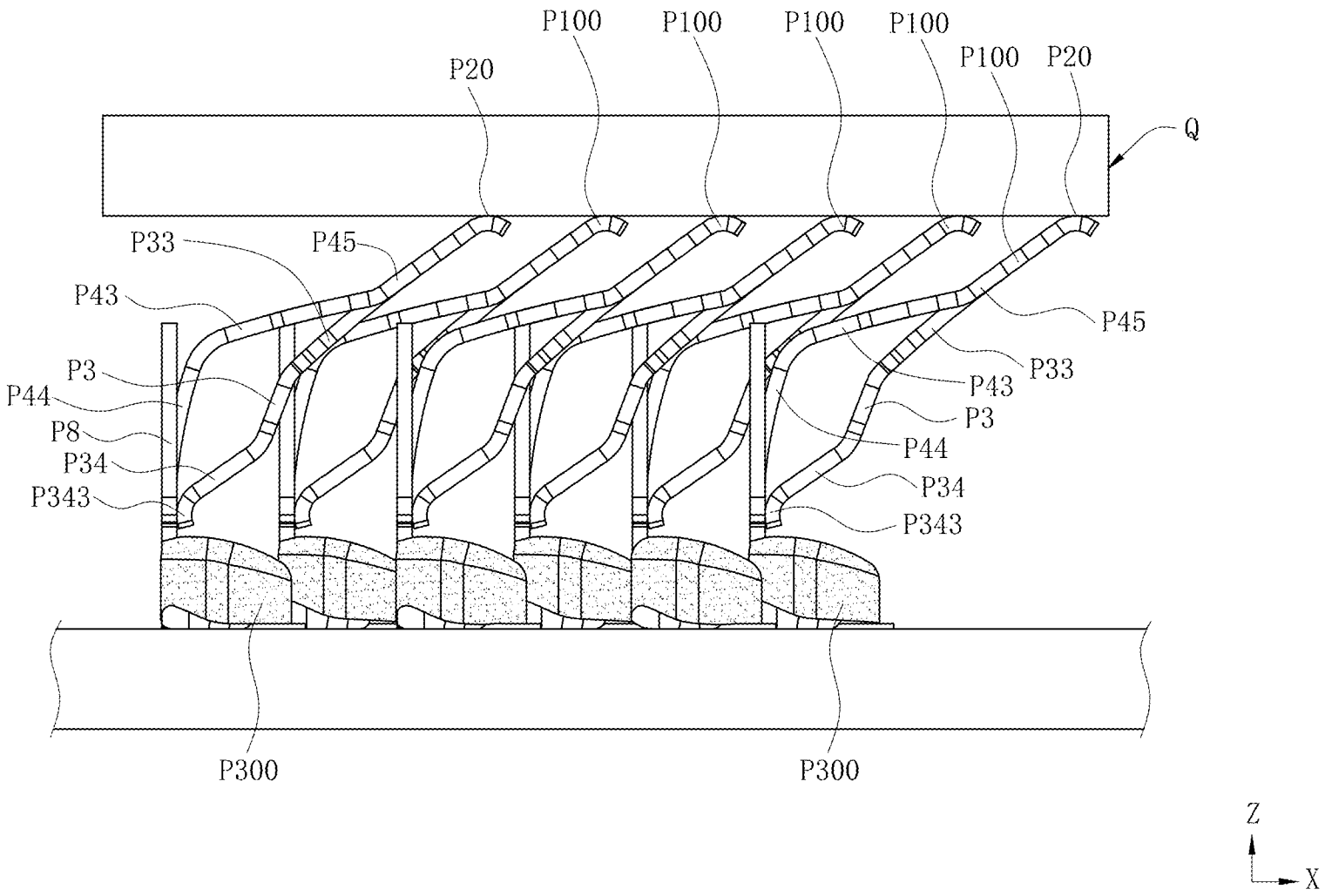
FIG. 16 is a side view of FIG. 15, where the chip module presses the electrical terminal downwardly to a final position.

As shown in FIG. 14 to FIG. 16, the lower end of the second elastic arm P3 has a contact portion P343, *and as shown in FIG. 13, the width of the contact portion P343 is greater than the width of the mating portion P20.* When the chip module Q does not downwardly abut the mating portion P20, the contact portion P343 does not abut the base P1. That is, when the chip module Q starts to downwardly abut the mating portion P20, the chip module Q is not subject to a counter-acting force from the second elastic arm P3, reducing the normal force of the electrical terminal P100, such that the chip module Q presses downwardly on the electrical terminals P100 more easily. When the chip module Q is pressed downwardly on the mating portion P20 to a final position, the contact portion P343 abuts a front surface of the base P1. Thus, three parallel conductive paths are formed between the chip module Q and the circuit board O. Further, the first elastic arm P2, the second elastic arm P3 and the third elastic arm P4, which are sequentially arranged in the left-right direction, increase the width of each electrical terminal P100, thus increasing the capacitance of each electrical terminal P100, and thereby reducing the impedance of each electrical terminal P100. In other embodiments, when the chip module Q does not downwardly abut the mating portion P20, the contact portion P343 may also abut the front surface of the base P1.

As shown in FIG. 11 to FIG. 14, the first elastic arm P2 further has a first blanking surface P22 located above the first torn surface P21. The first blanking surface P22 is formed by blanking the second elastic arm P3. *The first torn surface P21 protrudes from the first blanking surface P22 toward the second elastic arm P3, and the first blanking surface P22 is located above the first torn surface P21.* The first blanking surface P22 has a first arc surface P220 connected to the first torn surface P21. The first arc surface P220 may prevent the mold (not shown, same below) edge from being provided as a sharp angle at a connecting location of the first blanking surface P22 and the first torn surface P21, thus increasing the usage life of the mold. Correspondingly, the third elastic arm P4 has a second blanking surface P42 located above the second torn surface P41. The second blanking surface P42 is formed by blanking the second elastic arm P3. *The second torn surface P41 protrudes from the second blanking surface P42 toward the second elastic arm P3, and the second blanking surface P42 is located above the second torn surface P41.* The second blanking surface P42 has a second arc surface P420 connected to the second torn surface P41.

*As shown in FIG. 12 to FIG. 16, viewed from a left-right direction, there is a gap between the first elastic arm P2 and the second arm P3, a part of the solder ball P300 is under the gap.*

As shown in FIG. 11 to FIG. 14, the first elastic arm P2 has a first main body portion P23 and a first upper portion P25 formed by extending upwardly from the first main body portion P23. The first main body portion P23 is integrally connected to the base P1. The first upper portion P25 is integrally connected to the upper end of the through groove P5. The first main body portion P23 has a first vertical portion P24. The third elastic arm P4 has a second main body portion P43 and a second upper portion P45 formed by extending upwardly from the second main body portion P43. The second main body portion P43 is integrally connected to the base P1. [The second upper portion P45 is integrally connected to the first main body portion P23.] The second main body portion P43 has a second vertical portion P44. The second elastic arm P3 has a first portion P33 and a second portion P34 formed by extending downwardly from the first portion P33. The second portion P34 is located in front of the first main body portion P23 and the second main body portion P43, *and a portion of the second elastic arm P3 between the fourth end P32 and the third end P31 is curved and is in front of the base P1,* thereby being equivalent to increasing the width of each electrical terminal P100 in the front-rear direction, thus increasing the capacitance of each electrical terminal P100, reducing the impedance of each electrical terminal P100, and improving the high frequency performance of each electrical terminal P100. The mating portion P20, the first upper portion P25 of the first elastic arm P2, the second upper portion P45 of the third elastic arm P4 and the first portion P33 of the second elastic arm P3 are located on a same plane. The mating portion P20, the first upper portion P25, the second upper portion P45 and the first portion P33, being located on the same plane, may be used to be clamped and fixed by the mold, thus facilitating punching and bending the metal plate to form the electrical terminals P100. The second portion P34 includes a first section P341 formed by bending forwardly from the first portion P33 and extending downwardly, a second section P342 formed by bending backwardly from the first section P341 and extending downwardly, and the contact portion P343 formed by bending forwardly from the second section P342 and extending downwardly. Such configuration allows the contact portion P343 to abut the front surface of the base P1, thereby forming the three conductive paths, and reducing the impedance of each electrical terminal P100.

As shown in FIG. 11 to FIG. 14, two strip connecting portions P8 are formed by extending upwardly from the upper end of the base P1. One of the strip connecting portions P8 is located at a left side of the first elastic arm P2, and the other of the strip connecting portions P8 is located at a right side of the third elastic arm P4. The two strip connecting portions P8 are used to be connected to a same strip P7, and are used for inserting the electrical terminal P100 into the body P200. *The top end of the strip connecting portions P8 are roughly flush with the top end of the accommodating hole P201, and the bottom end of the first torn surface P21 and the second torn surface P41 are lower than the top end of the strip connecting portions P8. That is, the bottom end of the first torn surface P21 and the second torn surface P41 are lower than the accommodating hole P201.* The base P1 is positioned in the body P200, and on the premise of satisfying the elastic requirement of the electrical terminal P100, the space occupied by the electrical terminal P100 in the front-rear direction is not additionally increased. The first vertical portion P24 and a corresponding one of the strip connecting portions P8 are provided side by side in the left-right direction, and the second vertical portion P44 and a corresponding one of the strip connecting portions P8 are provided side by side in the left-right direction. Further, the first vertical portion P24 is formed by tearing from the corresponding one of the strip connecting portions P8, and the second vertical portion P44 is formed by tearing from the corresponding one of the strip connecting portions P8, such that on the premise of the capacitance of the electrical terminal P100 being proper, the width of the electrical terminal P100 is not additionally increased. The lower side of each electrical terminal P100 further has two clamping portions P6 to jointly clamp a solder ball P300 to be soldered to the circuit board O. The two clamping portions P6 are located at a front side of the base P1. The two clamping portions P6, the first elastic arm P2, the second elastic arm P3 and the third elastic arm P4 are located at a same side of the base P1, which is conducive to reducing the space occupied by each electrical terminal P100 in the front-rear direction, and facilitating dense arrangement of the electrical terminals P100. Before and after the chip module Q downwardly abuts the electrical terminals P100, there is no contact between the second elastic arm P3 and the two clamping portions P6 as well as the solder ball P300, thus preventing the second elastic arm P3 from abutting the clamping portions P6 or the solder ball P300 and causing an excessively large normal force of each electrical terminal P100. In this embodiment, each electrical terminal P100 is soldered to the circuit board O by the clamping portions P6 clamping the solder ball P300. In other embodiments, each electrical terminal P100 may form an elastic portion (not shown) by bending and extending downwardly from the base P1 to downwardly elastically abut the circuit board O.

As shown in FIG. 15 and FIG. 16, of the electrical terminals P100, two adjacent electrical terminals P100 in the front-rear direction are provided to be staggered in the front-rear direction. Viewing from a lateral direction, the second elastic arm P3 of a rear electrical terminal P100 of the two adjacent electrical terminals P100 in the front-rear direction and the first elastic arm P2 of a front electrical terminal P100 of the two adjacent electrical terminals P100 in the front-rear direction partially overlap with each other. In this embodiment, the electrical terminals P100 are arranged in multiple rows in the front-rear direction and the left-right direction, but the two adjacent rows of the electrical terminals P100 in the front-rear direction are provided to be staggered, and the second elastic arm P3 of the electrical terminal P100 in a back row and the first elastic arm P2 of the electrical terminal P100 in a front row partially overlap with each other. Such configuration reduces the distance between the adjacent electrical terminals P100 in the front-rear direction, thus facilitating the dense arrangement of the electrical terminals P100, and is conducive to increasing the capacitance of each electrical terminal P100 and reducing the impedance of each electrical terminal P100.

Figure 17:
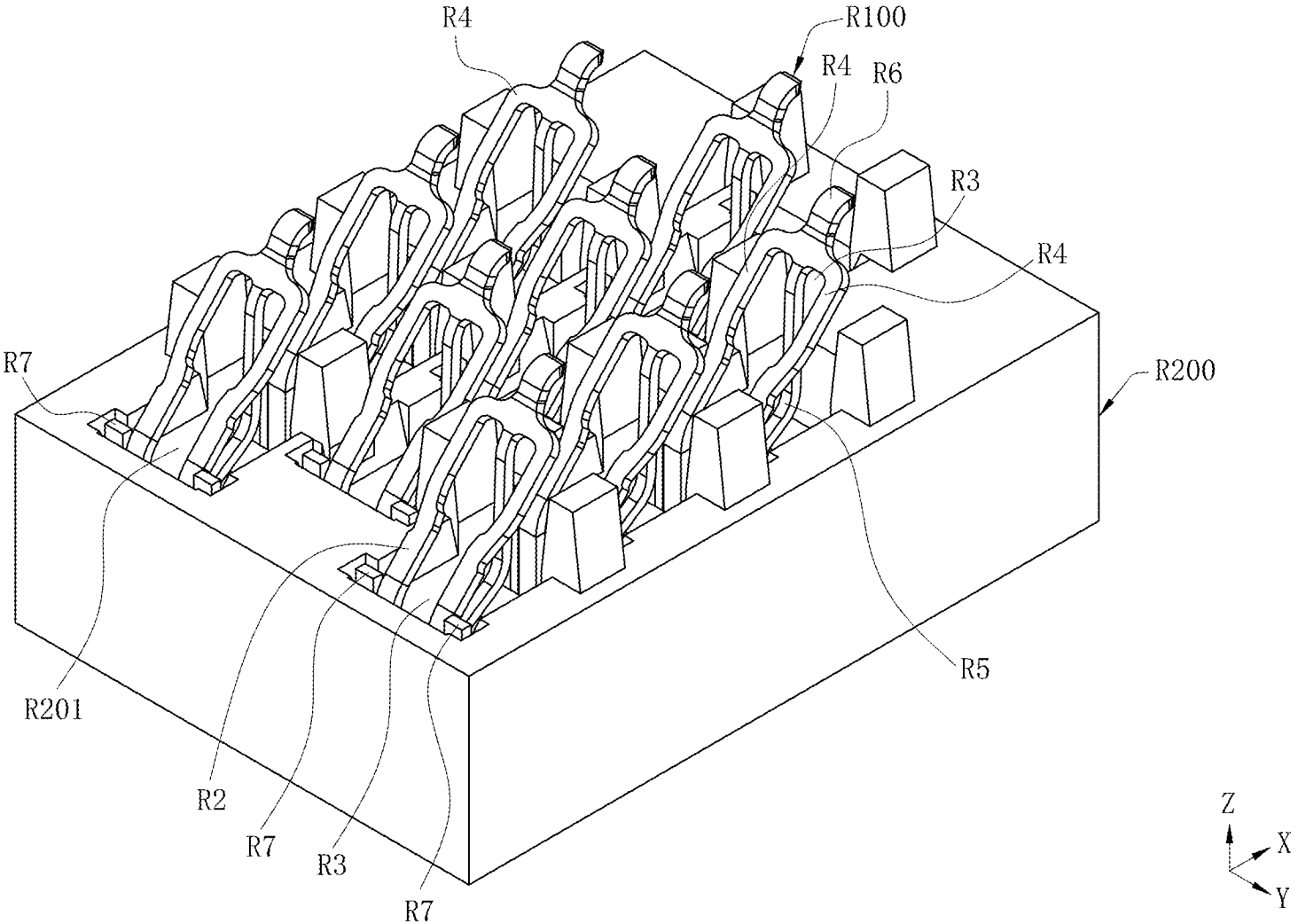
FIG. 17 is a schematic perspective view of an electrical connector according to a fourth embodiment of the present invention.
Figure 18:
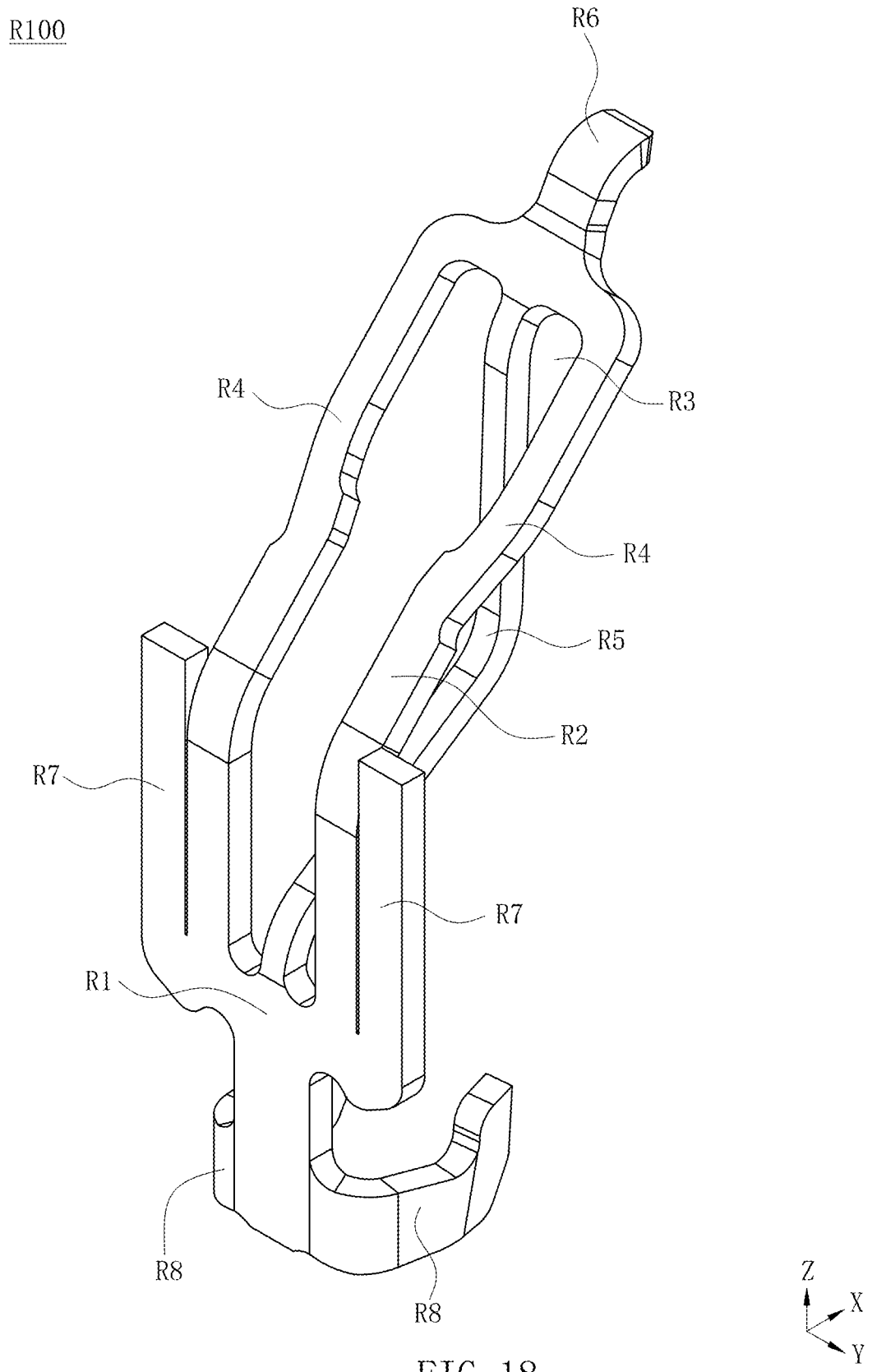
FIG. 18 is a schematic perspective view of an electrical terminal according to the fourth embodiment of the present invention.
Figure 19:
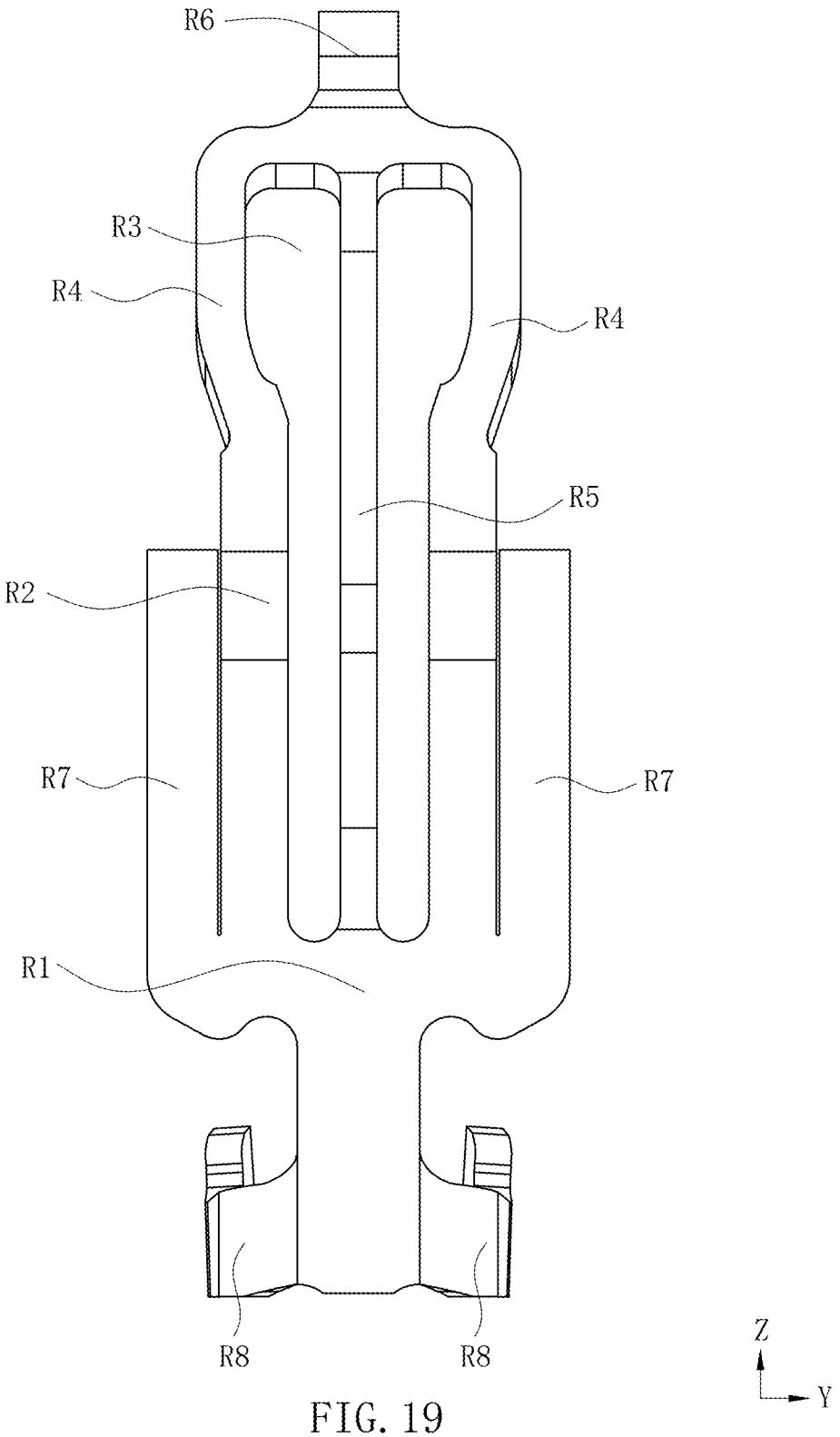
FIG. 19 is a back view of FIG. 18.
Figure 20:
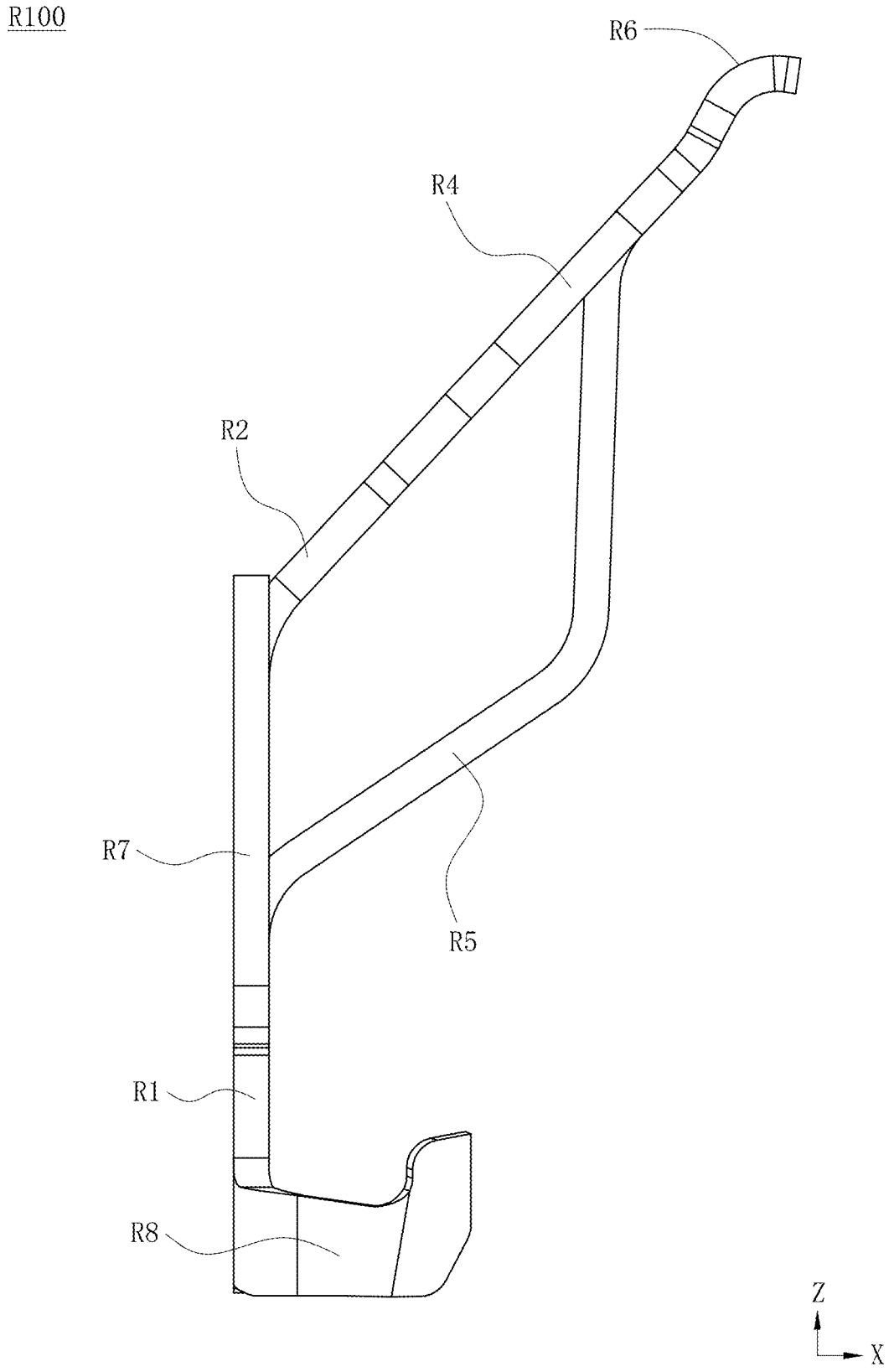
FIG. 20 is a side view of FIG. 18.
Figure 22:
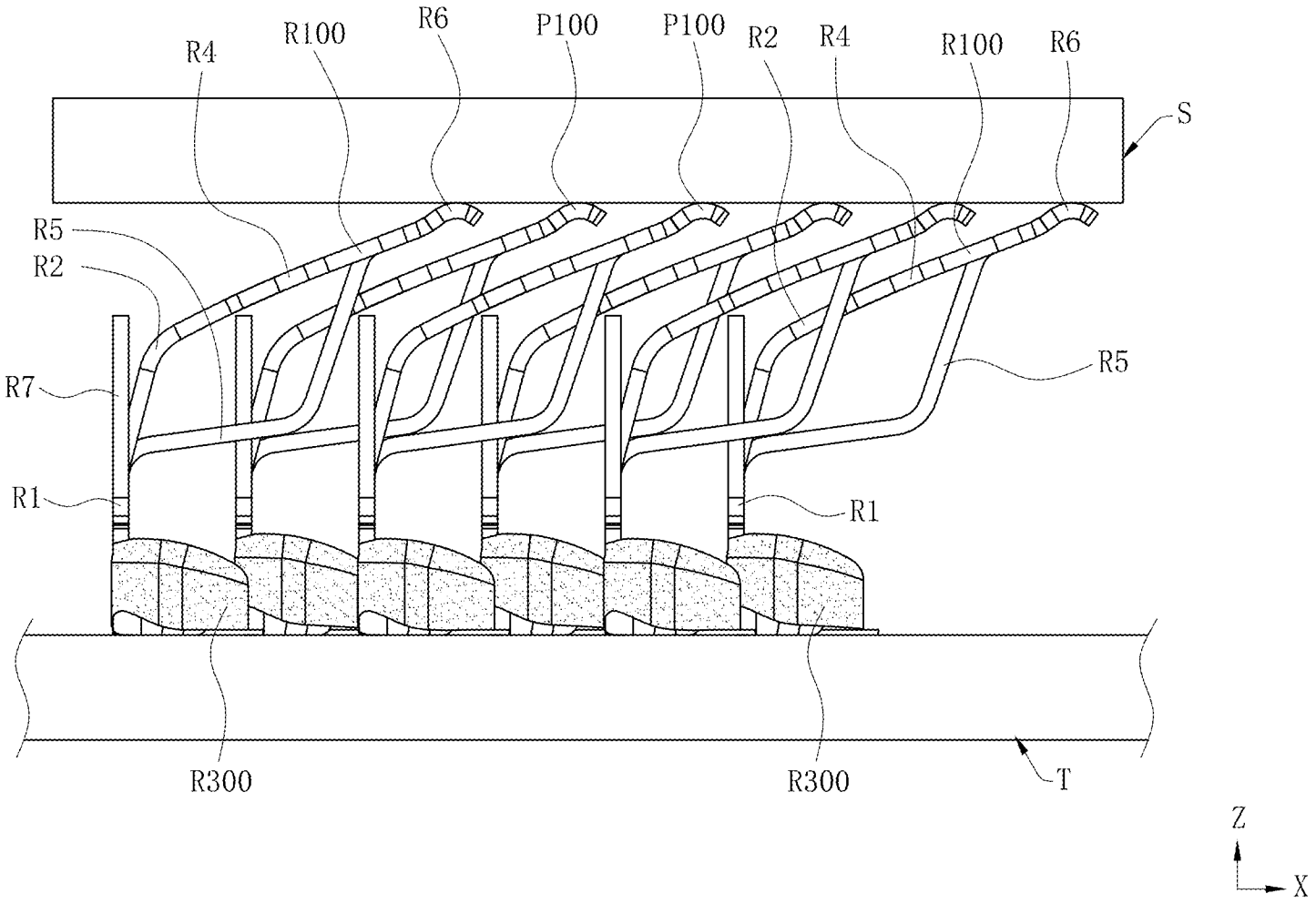
FIG. 22 is a side view of FIG. 21, where the chip module presses the electrical terminal downwardly to a final position.

FIG. 17, FIG. 18 and FIG. 22 show an electrical connector R according to a fourth embodiment of the present invention, which is used to electrically connect a chip module S to a circuit board T. The electrical connector R includes a body R200 and a plurality of electrical terminals R100 accommodated in the body R200. The body R200 has a plurality of accommodating holes R201 running vertically therethrough, and the electrical terminals R100 are correspondingly accommodated in the accommodating holes R201. The electrical terminals R100 are formed by punching a metal plate. Each electrical terminal R100 includes a base R1 being vertical flat plate shaped. An elastic arm R2 is formed by extending upwardly from the base R1, where a through groove R3 runs through the elastic arm R2 along a thickness direction of the elastic arm R2, and the elastic arm R2 forms two branches R4 at a left side and a right side of the through groove R3. A soft portion R5 is integrally connecting an upper end and a lower end of the through groove R3, where the two branches R4 are located at a left side and a right side of the soft portion R5. The elastic arm R2 has a mating portion R6 in front of the through groove R3, which is used to upwardly abut the chip module S.

As shown in FIG. 18 to FIG. 21, in the left-right direction, the two branches R4 and the soft portion R5 increase the width of each electrical terminal R100. The soft portion R5 protrudes forwardly relative to the two branches R4, thus increasing the thickness of each electrical terminal R100 in the front-rear direction, increasing the capacitance of each electrical terminal R100, and reducing the impedance of each electrical terminal R100. An average width of the soft portion R5 is less than 1.5 times a thickness of the soft portion R5 (in this embodiment, the width of the soft portion R5 is consistent, and the width and the thickness of the soft portion R5 are equal), and the width of the soft portion R5 is less than the width of any of the branches R4. A softness of the soft portion R5 is greater than the softness of the two branches R4. Thus, the normal force of the soft portion R5 is smaller, such that the chip module S presses downwardly on the electrical terminals R100 more easily. Each electrical terminal R100 form three conductive paths, which is conducive to reducing the impedance of each electrical terminal R100. Each electrical terminal R100 further has two clamping portions R8 to jointly clamp a solder ball R300 to solder the electrical terminal R100 to the circuit board T. The two clamping portions R8 are located at a front side of the base R1. The two clamping portions R8 and the elastic arm R2 are located at a same side of the base R1, which is conducive to reducing the space occupied by each electrical terminal R100 in the front-rear direction, and facilitating dense arrangement of the electrical terminals R100. There is no contact between the soft portion R5 and the two clamping portions R8.

As shown in FIG. 18 to FIG. 21, each electrical terminal R100 further has two strip connecting portions R7, which are used to be connected to a same strip (not shown). The two strip connecting portions R7 extend upwardly from an upper end of the base R1 and are located at a left side and a right side of the elastic arm R2. A maximum distance between two side edges of the two branches R4 away from the soft portion R5 is greater than a distance between two side edges of the two strip connecting portions R7 adjacent to the soft portion R5 and is less than a distance between two side edges of the two strip connecting portions R7 away from the soft portion R5. In a lateral direction, the distance between the two branches R4 is larger, which is conducive to increasing the capacitance of each electrical terminal R100. Further, each branch R4 does not pass outwardly beyond the corresponding one of the strip connecting portions R7, and does not additionally increase the width of each electrical terminal R100, thus reducing the space occupied by the electrical connector R.

Figure 21:
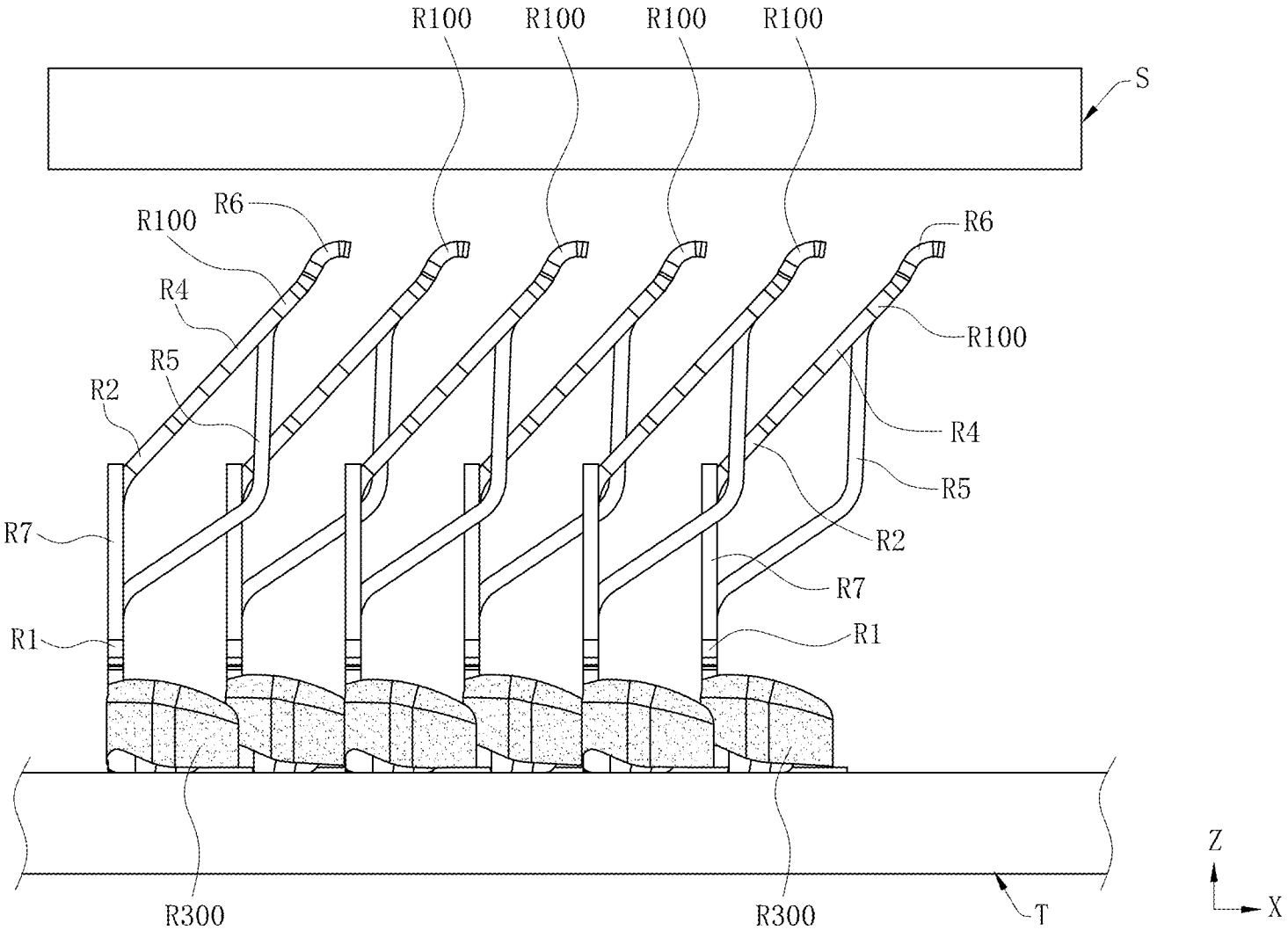
FIG. 21 is a side view of the electrical connector (with the body being removed) according to the fourth embodiment of the present invention.

As shown in FIG. 21 and FIG. 22, of the electrical terminals R100, two adjacent electrical terminals R100 in the front-rear direction are provided to be staggered in the front-rear direction. Viewing from the lateral direction, the soft portion R5 of a rear electrical terminal R100 of the two adjacent electrical terminals R100 in the front-rear direction and the branches R4 of a front electrical terminal R100 of the two adjacent electrical terminals R100 in the front-rear direction partially overlap with each other. In this embodiment, the electrical terminals R100 are arranged in multiple rows in the front-rear direction and the left-right direction, but the two adjacent rows of the electrical terminals R100 in the front-rear direction are provided to be staggered, and the soft portion R5 of the electrical terminal R100 in a back row and the branches R4 of the electrical terminal R100 in a front row partially overlap with each other. Such configuration reduces the distance between the electrical terminals R100 of the adjacent rows in the front-rear direction, thus facilitating the dense arrangement of the electrical terminals R100, and is conducive to increasing the capacitance of each electrical terminal R100 and reducing the impedance of each electrical terminal R100.

To sum up, the electrical terminal and the electrical connector according to certain embodiments of the present invention have the following beneficial effects:

(1) The protruding portion 21 protrudes and extends from the side of the first elastic arm 2 adjacent to the second elastic arm 3. The lower surface of the protruding portion 21 has the contact surface 211 overlapping the contact portion 31 in the vertical direction. The contact portion 31 upwardly abuts the contact surface 211. When the chip module presses downwardly on the electrical terminal 100, the contact portion 31 can move on the contact surface 211. Therefore, the chip module does not need to press downwardly on the mating portion 23 with a relative large pressure.

(2) The second elastic arm 3 is firstly cut off from the protruding portion 21, and then formed by tearing from the first torn surface 22 and the second torn surface 41. That is, compared with the related art, the second elastic arm 3 uses a material for forming the through groove in the related art, thereby reducing material wastes and costs. In addition, widths of the first elastic arm 2 and the third elastic arm 4 are made relatively large when the materials are the same and the width of the second elastic arm 3 remains unchanged, thereby improving high-frequency performance of the electrical terminal 100.

(3) Due to the existence of the first elastic arm 2, the second elastic arm 3, and the third elastic arm 4, a first conductive path sequentially passing through the mating portion 23, the first elastic arm 2, and the base 1, a second conductive path sequentially passing through the mating portion 23, the second elastic arm 3, and the base 1, and a third conductive path sequentially passing through the mating portion 23, the third elastic arm 4, and the base 1 are formed between the chip module and the circuit board. The three conductive paths are connected in parallel to one another, reducing impedance during telecommunication transmission between the chip module and the circuit board, thereby improving high-frequency performance.

(4) Three parallel conductive paths are formed between the chip module Q and the circuit board O, thus reducing the impedance of each electrical terminal P100. Further, the first elastic arm P2, the second elastic arm P3 and the third elastic arm P4, which are sequentially arranged in the left-right direction, increase the width of each electrical terminal P100. The second portion P34 is located in front of the first main body portion P23 and the second main body portion P43, thereby being equivalent to increasing the width of each electrical terminal P100 in the front-rear direction, thus increasing the capacitance of each electrical terminal P100, and reducing the impedance of each electrical terminal P100, which is conducive to transmission of high frequency signals.

(5) The mating portion P20, the first upper portion P25 of the first elastic arm P2, the second upper portion P45 of the third elastic arm P4 and the first portion P33 of the second elastic arm P3 are located on a same plane. The mating portion P20, the first upper portion P25, the second upper portion P45 and the first portion P33, being located on the same plane, may be used to be clamped and fixed by the mold, thus facilitating punching and bending the metal plate to form the electrical terminals P100.

(6) Each electrical terminal R100 has two branches R4 and a soft portion R5. When the chip module S presses downwardly on the electrical terminals R100, each electrical terminal R100 forms three conductive paths, thus reducing the impedance of each electrical terminal R100. Further, the soft portion R5 protrudes forwardly relative to the two branches R4, increasing the thickness of each electrical terminal R100, increasing the capacitance of each electrical terminal R100, and reducing the impedance of each electrical terminal R100. Since the soft portion R5 is soft, the normal force of the soft portion R5 is smaller, which almost does not generate a counter-acting force to the chip module S, such that the chip module S presses downwardly on the electrical terminals R100 more easily.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, configured to be electrically connected to a chip module, the electrical connector comprising:

a body, having a plurality of accommodating holes running vertically; and a plurality of electrical terminals, respectively accommodated in the accommodating holes correspondingly, wherein each of the electrical terminals has:

a base, being flat plate shaped;

[a strip connecting portion, formed by extending upwardly from an upper end of the base, and configured to be connected to a strip;]

a first elastic arm formed by extending upwardly from [the] *an* upper end of the base, wherein a top portion of the first elastic arm has a mating portion configured to upwardly abut the chip module, a through groove runs through the first elastic arm along a thickness direction of the first elastic arm, one of an upper end and a lower end of the through groove is defined as a first end, and the other of the upper end and the lower end of the through groove is defined as a second end; and a second elastic arm, wherein one of an upper end and a lower end of the second elastic arm is defined as a third end, the other of the upper end and the lower end of the second elastic arm is defined as a fourth end, the third end is integrally connected to the first end, the fourth end is integrally connected to the second end prior to being formed and is broken from the second end after being formed, the second elastic arm has a contact portion, and when the chip module is pressed downwardly on the mating portion to a final position, the contact portion is in contact with the base or the first elastic arm;

wherein when the first end is the upper end of the through groove and the second end is the lower end of the through groove, the third end is the upper end of the second elastic arm and the fourth end is the lower end of the second elastic arm; and when the first end is the lower end of the through groove and the second end is the upper end of the through groove, the third end is the lower end of the second elastic arm and the fourth end is the upper end of the second elastic arm.

2. The electrical connector according to claim 1, wherein the electrical terminal further has a third elastic arm, a lower end of the third elastic arm is integrally connected to the base and an upper end is integrally connected to the first elastic arm, the first elastic arm and the third elastic arm are located at a left side and a right side of the second elastic arm, a first torn surface is provided on one side of the first elastic arm adjacent to the second elastic arm, a second torn surface is provided on one side of the third elastic arm adjacent to the second elastic arm, and two opposite sides of the second elastic arm are formed correspondingly by tearing from the first torn surface and the second torn surface.

3. The electrical connector according to claim 1, wherein a torn surface is provided on one side of the first elastic arm adjacent to the second elastic arm, the second elastic arm is formed by tearing from the torn surface; the first elastic arm further has a blanking surface, the blanking surface is formed by blanking the second elastic arm, and the blanking surface has an arc surface connected to the torn surface.

4. The electrical connector according to claim 1, wherein the first end is the lower end of the through groove, the second end is the upper end of the through groove, the third end is the lower end of the second elastic arm, the fourth end is the upper end of the second elastic arm, and the first elastic arm has a contact surface overlapping with the contact portion in a vertical direction, such that the contact portion upwardly abuts the contact surface.

5. The electrical connector according to claim 1, wherein the first end is the upper end of the through groove, the second end is the lower end of the through groove, the third end is the upper end of the second elastic arm, the fourth end is the lower end of the second elastic arm, and the contact portion abuts a front surface of the base.

6. The electrical connector according to claim 5, wherein when the chip module does not downwardly abut the mating portion, the contact portion does not abut the base.

7. The electrical connector according to claim 1, wherein *each of the electrical terminals has a strip connecting portion formed by extending upwardly from an upper end of the base, and configured to be connected to a strip,* the first elastic arm has a vertical portion, and the vertical portion and the strip connecting portion are provided side by side in a left-right direction.

8. The electrical connector according to claim 1, wherein the first elastic arm has a main body portion and an upper portion formed by extending upwardly from the main body portion, the second elastic arm has a first portion and a second portion formed by extending downwardly from the first portion, the second portion is located in front of the main body portion, and the mating portion, the upper portion of the first elastic arm and the first portion of the second elastic arm are located on a same plane.

9. The electrical connector according to claim 8, wherein the second portion has a first section formed by bending forwardly from the first portion and extending downwardly, a second section formed by bending backwardly from the first section and extending downwardly, and the contact portion formed by bending forwardly from the second section and extending downwardly.

10. The electrical connector according to claim 1, wherein two adjacent electrical terminals of the electrical terminals in a front-rear direction are provided to be staggered in the front-rear direction, and viewing from a lateral direction, the second elastic arm of a rear electrical terminal of the two adjacent electrical terminals in the front-rear direction and the first elastic arm of a front electrical terminal of the two adjacent electrical terminals in the front-rear direction at least partially overlap with each other.

*11. The electrical connector according to claim 3, wherein the blanking surface is located above the torn surface, and the torn surface protrudes from the blanking surface toward the second elastic arm in a left-right direction.*

*12. The electrical connector according to claim 11, wherein a bottom end of the torn surface is lower than a top end of the accommodating hole, and a top end of the blanking surface is higher than the top end of the accommodating hole.*

*13. The electrical connector according to claim 1, wherein each of the electrical terminals has a pair of clamping portions to jointly clamp a solder ball, and view-*

*ing from a left-right direction, a gap exists between the first elastic arm and the second arm, and a part of the solder ball is under the gap.*

*14. The electrical connector according to claim 1, wherein a width of the contact portion is greater than a width of the mating portion.*

*15. The electrical connector according to claim 1, wherein a portion of the second elastic arm between the fourth end and the third end is curved and is in front of the base.*

* * * * *